(12) United States Patent
Hemstock

(10) Patent No.: US 9,909,405 B2
(45) Date of Patent: *Mar. 6, 2018

(54) DESANDING APPARATUS AND A METHOD OF USING SAME

(71) Applicant: SPECIALIZED DESANDERS INC., Calgary (CA)

(72) Inventor: Christopher Hemstock, Calgary (CA)

(73) Assignee: Specialized Desanders Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,717

(22) Filed: Dec. 3, 2015

(65) Prior Publication Data

US 2016/0082377 A1    Mar. 24, 2016

Related U.S. Application Data

(63) Continuation-in-part of application No. 14/566,849, filed on Dec. 11, 2014, which is a
(Continued)

(51) Int. Cl.
*E21B 43/34* (2006.01)
*B01D 19/00* (2006.01)
(Continued)

(52) U.S. Cl.
CPC .......... *E21B 43/34* (2013.01); *B01D 19/0021* (2013.01); *B01D 19/0042* (2013.01);
(Continued)

(58) Field of Classification Search
CPC ............ B01D 21/0003; B01D 21/2483; B01D 21/2494; B01D 21/2405; B01D 19/0042;
(Continued)

(56) References Cited

U.S. PATENT DOCUMENTS 1,494,670 A    5/1924  Delaney
1,535,721 A    4/1925  Gill
(Continued)

FOREIGN PATENT DOCUMENTS

CA    2041479 A1    4/1998
CA    2433741 A1    7/2003
(Continued)

OTHER PUBLICATIONS

PCT/CA2015/051266 International Search Report and Written Opinion.
(Continued)

*Primary Examiner* — Dung H Bui
(74) *Attorney, Agent, or Firm* — Parlee McLaws LLP (CGY); Sean Goodwin

(57) ABSTRACT

An apparatus and method for removing particulates from a multiple-phase fluid stream is disclosed. The apparatus comprises a treatment chamber having a fluid inlet for receiving the multiple-phase fluid stream. The apparatus also comprises a recovery chamber having a gas channel and a liquid channel in fluid communication with the treatment chamber at a gas and a liquid port, respectively. The gas and liquid channels converge at an intake port of a fluid outlet for discharging particulate-removed gas and liquid.

18 Claims, 30 Drawing Sheets

Related U.S. Application Data continuation-in-part of application No. 13/372,291, filed on Feb. 13, 2012, now Pat. No. 8,945,256.

(60) Provisional application No. 62/087,604, filed on Dec. 4, 2014.

(51) Int. Cl.
  *B01D 21/00* (2006.01)
  *B01D 21/24* (2006.01)
  *E21B 27/00* (2006.01)

(52) U.S. Cl.
  CPC ..... *B01D 21/0003* (2013.01); *B01D 21/2405* (2013.01); *B01D 21/2483* (2013.01); *B01D 21/2494* (2013.01); *E21B 27/00* (2013.01); *B01D 2221/04* (2013.01)

(58) Field of Classification Search
  CPC . B01D 19/0021; B01D 2221/04; E21B 43/34; E21B 27/00
  See application file for complete search history.

(56) References Cited

U.S. PATENT DOCUMENTS

| | | |
|---|---|---|
| 1,601,611 A | 9/1926 | Downey |
| 1,702,612 A | 2/1929 | Morse |
| 1,851,030 A | 3/1932 | Adams |
| 2,049,068 A | 7/1936 | Loupe |
| 2,058,044 A | 10/1936 | Spencer |
| 2,206,835 A | 7/1940 | Combs |
| 2,228,401 A | 1/1941 | Pressler |
| 2,510,049 A * | 5/1950 | Neeson ............. F16T 1/24 55/333 |
| 2,547,190 A | 4/1951 | Wilson |
| 2,610,697 A | 9/1952 | Lovelady |
| 2,664,963 A | 1/1954 | Lovelady |
| 2,689,623 A * | 9/1954 | Schebler ............. B01D 45/08 55/342 |
| 2,706,531 A | 4/1955 | Lovelady |
| 2,751,998 A | 6/1956 | Glasgow |
| 3,255,571 A | 6/1966 | Walker et al. |
| 3,273,318 A | 9/1966 | Meyer |
| 3,310,109 A | 3/1967 | Marx |
| 3,331,188 A | 7/1967 | Sinex |
| 3,396,512 A | 8/1968 | McMinn |
| 3,426,904 A | 2/1969 | Katsua |
| 3,553,940 A | 1/1971 | Piner, Jr. |
| 3,574,096 A | 4/1971 | Carlstedt |
| 3,852,192 A | 12/1974 | Fassell |
| 4,073,734 A | 2/1978 | Lowrie |
| 4,115,279 A | 9/1978 | Toft |
| 4,122,009 A | 10/1978 | Tao |
| 4,208,196 A | 6/1980 | Coggins |
| 4,238,333 A | 12/1980 | Tidwell |
| 4,257,895 A | 3/1981 | Murdock |
| 4,400,271 A | 8/1983 | Lunceford |
| 4,539,023 A | 9/1985 | Boley |
| 4,604,196 A | 8/1986 | Lowrie et al. |
| 4,617,031 A | 10/1986 | Suh |
| 4,673,500 A | 6/1987 | Hoofnagle et al. |
| 4,721,565 A | 1/1988 | Carroll |
| 4,778,494 A | 10/1988 | Patterson |
| 4,939,817 A | 7/1990 | Weber |
| 4,975,205 A | 12/1990 | Sloan |
| 5,064,448 A | 11/1991 | Choi |
| 5,173,194 A | 12/1992 | Hering |
| 5,245,057 A | 9/1993 | Shirtum |
| 5,295,537 A | 3/1994 | Trainer |
| 5,326,474 A | 7/1994 | Adams et al. |
| 5,415,776 A | 5/1995 | Homan |
| 5,500,039 A | 3/1996 | Mori |
| 5,522,999 A | 6/1996 | Broussard |
| 5,575,909 A | 11/1996 | Foster |
| 5,582,271 A | 12/1996 | Mielo |
| 5,599,507 A | 2/1997 | Shaw |
| 5,827,357 A | 10/1998 | Farion |
| 5,865,992 A | 2/1999 | Edmondson |
| 5,900,137 A | 5/1999 | Homan |
| 5,928,519 A | 7/1999 | Homan |
| 6,099,743 A | 8/2000 | Pedersen |
| 6,119,779 A | 9/2000 | Gipson et al. |
| 6,158,512 A | 12/2000 | Unsgaard |
| 6,189,617 B1 | 2/2001 | Sorhus et al. |
| 6,214,092 B1 | 4/2001 | Odom et al. |
| 6,214,220 B1 | 4/2001 | Favret |
| 6,269,880 B1 | 8/2001 | Landry |
| 6,409,808 B1 | 6/2002 | Chamberlain |
| 6,419,730 B1 | 7/2002 | Chavez |
| 6,458,191 B1 | 10/2002 | Lingelem |
| 6,537,458 B1 | 3/2003 | Polderman |
| 6,783,683 B2 | 8/2004 | Collings |
| 6,821,322 B2 | 11/2004 | Milia |
| 6,983,852 B2 | 1/2006 | Hemstock et al. |
| 7,144,503 B2 * | 12/2006 | Oserod ................. B01D 17/00 210/188 |
| 7,429,332 B2 | 9/2008 | Surjaatmadja et al. |
| 7,614,389 B2 | 11/2009 | Ruckwied |
| 7,785,400 B1 | 8/2010 | Worley |
| 8,308,959 B2 | 11/2012 | Noles, Jr. |
| 8,337,603 B2 | 12/2012 | Akhras et al. |
| 8,623,221 B1 | 1/2014 | Boyd et al. |
| 2002/0162806 A1 | 11/2002 | Komistek |
| 2004/0074838 A1 | 4/2004 | Hemstock et al. |
| 2004/0184976 A1 | 9/2004 | Pagani |
| 2011/0078987 A1 | 4/2011 | Shishov et al. |
| 2011/0199855 A1 | 8/2011 | Hanada |
| 2015/0273374 A1 * | 10/2015 | Leiss ................. B01D 45/08 95/271 |

FOREIGN PATENT DOCUMENTS

| | | |
|---|---|---|
| CA | 2407554 C | 4/2004 |
| CA | 2646150 | 6/2009 |
| CA | 2646150 A1 | 6/2009 |
| CA | 2799278 A1 | 8/2013 |
| EP | 0208981 B1 | 3/1991 |
| GB | 773096 A | 4/1957 |
| GB | 1048873 | 11/1966 |
| JP | 2005-074362 | 3/2003 |
| JP | 2012-139681 | 12/2012 |
| WO | 2002063231 A1 | 8/2002 |
| WO | 2002070101 A2 | 9/2002 |
| WO | 2009055291 A2 | 4/2009 |
| WO | 2010034325 | 4/2010 |
| WO | 2010034325 A1 | 4/2010 |
| WO | 2013016952 A1 | 2/2013 |
| WO | WO 2015/089652 A1 | 6/2015 |

OTHER PUBLICATIONS

PCT/CA2012/050915—International Search Report.
PCT/CA2014/051170 International Search Report and Written Opinion.
JP,2005-0743862,A—English Translation, Japanese Patent Office.
JP,2012-139681,A—English Translation, Japanese Patent Office.
PCT/CA2014/050712 International Search Report and Written Opinion.

* cited by examiner

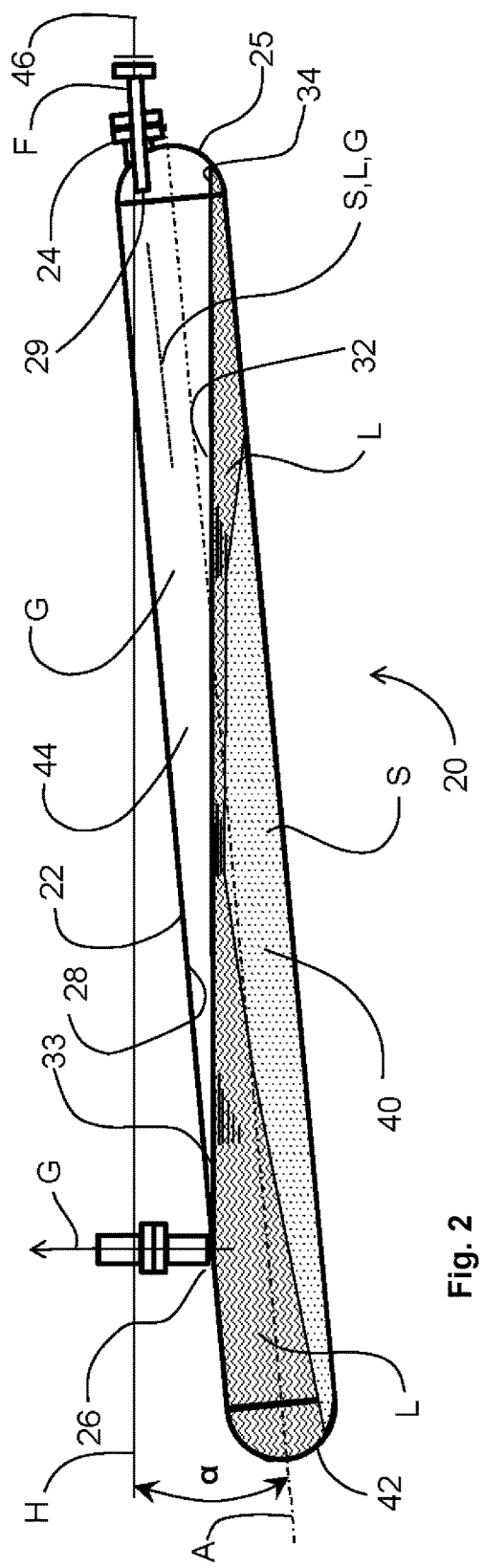
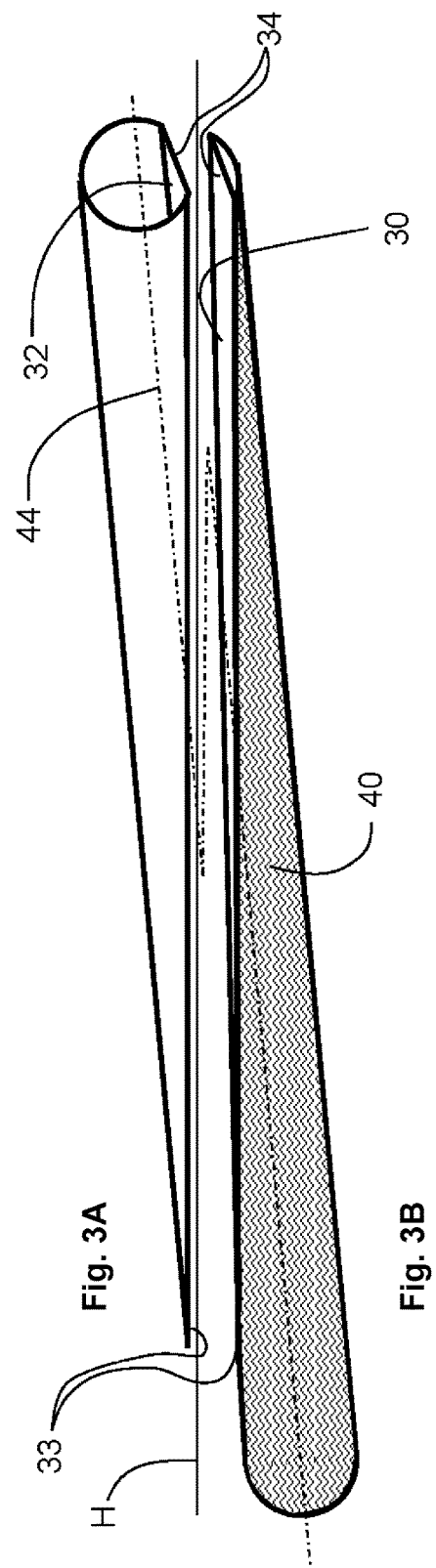
Fig. 2
Fig. 3A
Fig. 3B

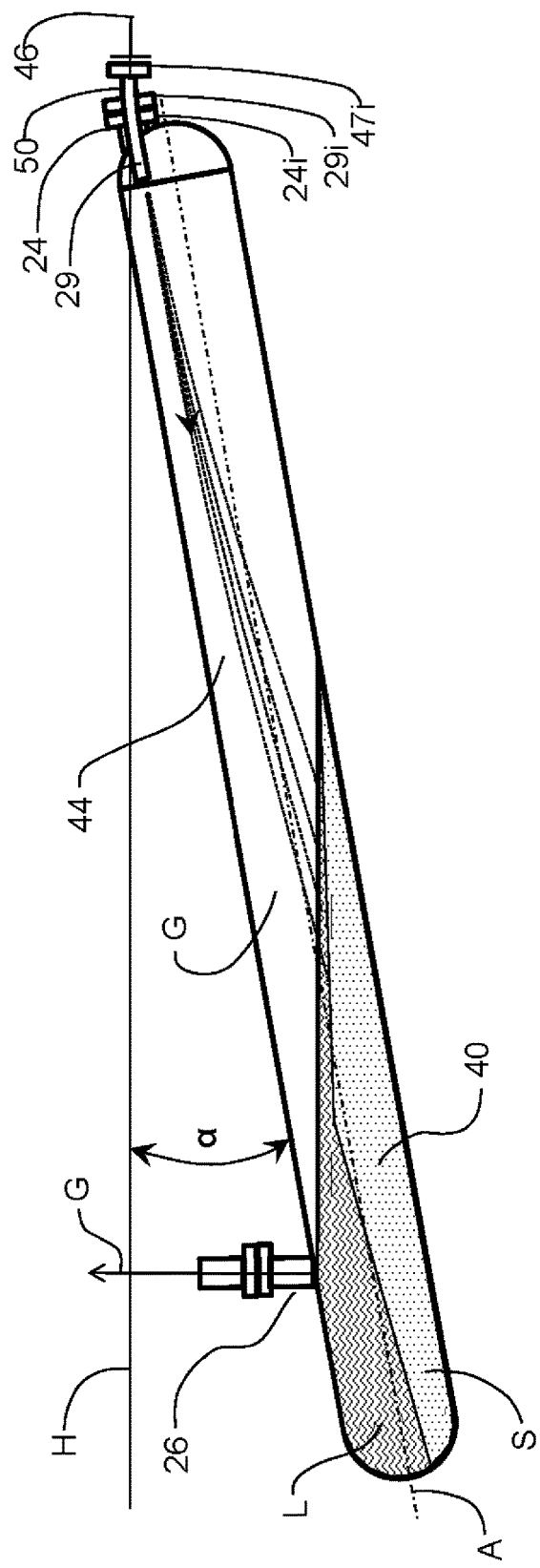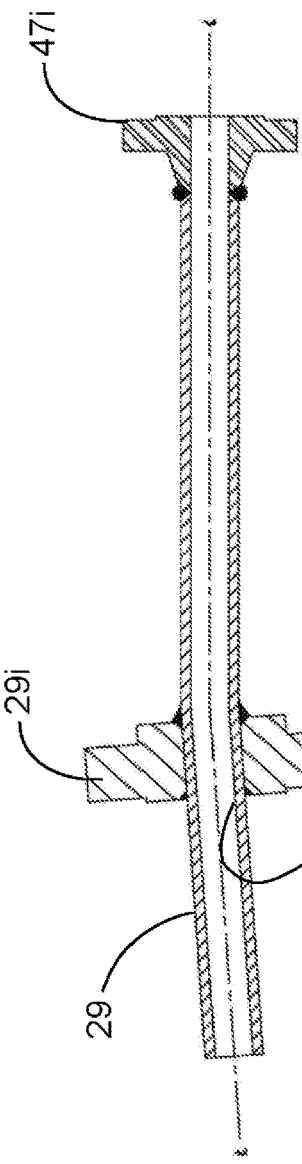
Fig. 4
Fig. 5

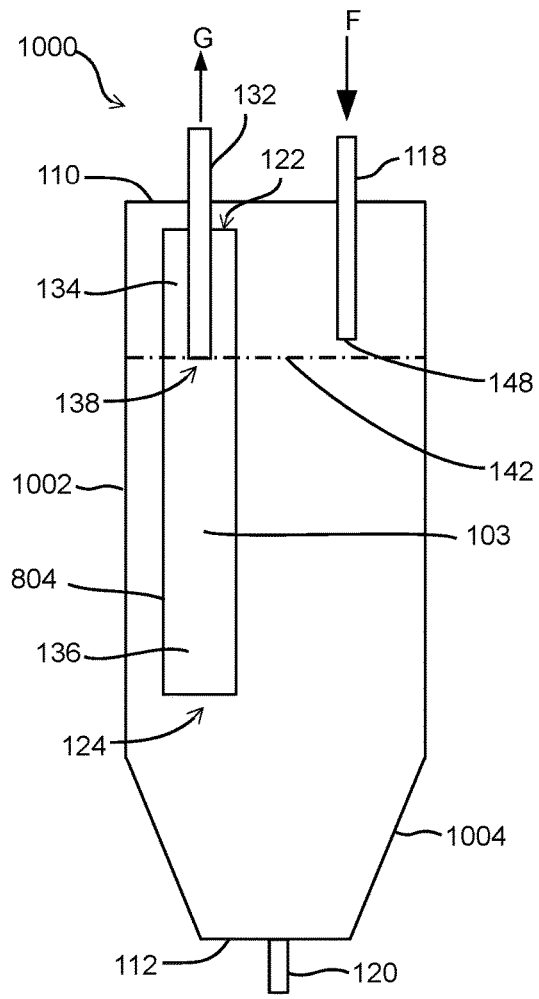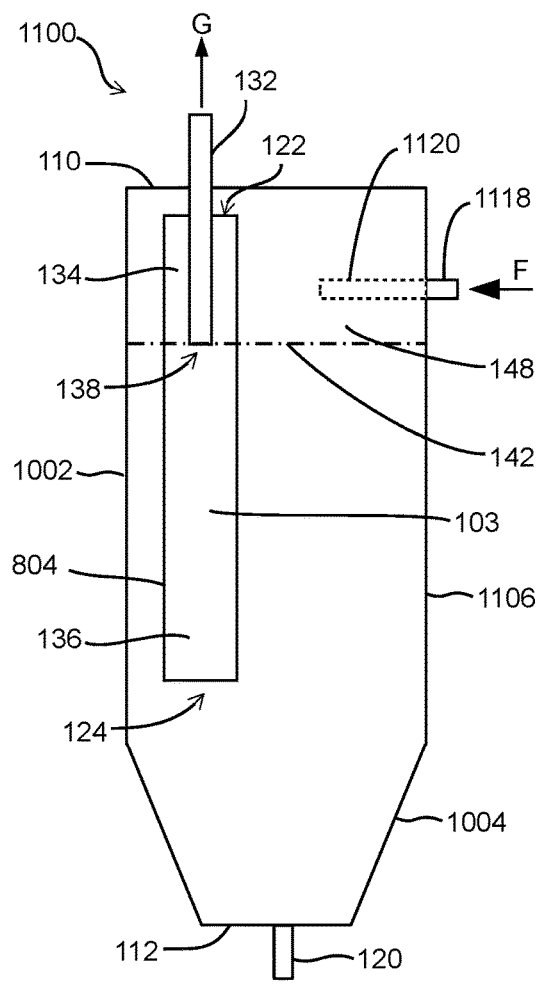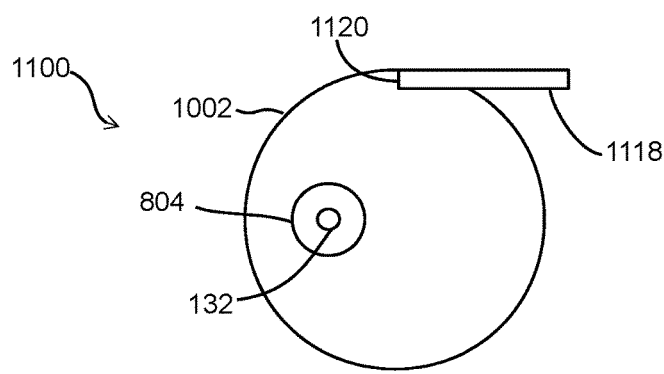

DESANDING APPARATUS AND A METHOD OF USING SAME

CROSS-REFERENCE TO RELATED APPLICATION

This application is a continuation-in-part of U.S. patent application Ser. No. 14/566,849, filed on Dec. 11, 2014, which is a continuation-in-part of U.S. patent application Ser. No. 13/372,291, filed on Feb. 13, 2012, and issued on Feb. 3, 2015 as U.S. Pat. No. 8,945,256 B2, the content of which is incorporated herein by reference in its entirety. Further, this application claims benefit of U.S. provisional patent application Ser. No. 62/087,604, filed on Dec. 4, 2014, the content of which is incorporated herein by reference in its entirety.

FIELD

The present disclosure generally relates to an apparatus and a method for removing particulates from multiphase fluid streams, and in particular, relates to an apparatus and a method for removing sands from multiphase fluid streams produced from an oil or gas well while minimizing the abrasion to the equipment involved.

BACKGROUND

Production from wells in the oil and gas industry often contains particulates such as sand. These particulates could be part of the formation from which the hydrocarbon is being produced, introduced from hydraulic fracturing, or fluid loss material from drilling mud or fracturing fluids, or from a phase change of produced hydrocarbons caused by changing conditions at the wellbore (Asphalt or wax formation). As the particulates are produced, problems occur due to abrasion and plugging of production equipment. In a typical startup after stimulating a well by fracturing, the stimulated well may produce sand until the well has stabilized, often lasting for several months after production commences. Other wells may produce sand for a much longer period of time.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to service personnel. Releasing such fluid to the environment is damaging to the environment resulting in expensive cleanup and loss of production. Repair costs are also high.

In all cases, retention of particulates contaminates surface equipment and the produced fluids and impairs the normal operation of the oil and gas gathering systems and process facilities. Therefore, desanding devices are required for removing sand from the fluid stream. Due to the nature of the gases handled, including pressure and toxicity, all vessels and pressure piping in desanding devices must be manufactured and approved by appropriate boiler and pressure vessel safety authorities.

In one existing system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive and places the pressure controlling choke at risk of failure. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

Another known system includes employing filters to remove particulates. A common design is to have a number of fiber-mesh filter bags placed inside a pressure vessel. The density of the filter bag fiber-mesh is matched to the anticipated size of the particulates. Filter bags are generally not effective in the removal of particulates in a multiphase condition. Usually multiphase flow in the oil and gas operations is unstable. Large slugs of fluid followed by a gas mist are common. In these cases, the fiber bags become a cause of pressure drop and often fail due to the liquid flow there through. Due to the high chance of failure, filter bags may not be trusted to remove particulates in critical applications or where the flow parameters of a well are unknown. An additional problem with filter bags in most jurisdictions is the cost associated with disposal. The fiber-mesh filter bags are considered to be contaminated with hydrocarbons and must be disposed of in accordance to local environmental regulation.

Hydrocylone or cyclone devices are also known for separating particles from liquid mixture by exploiting the centripetal force. By injecting the liquid mixture into a vessel and spinning therein, heavy or large particles move outward towards the wall of the vessel due to the centripetal force, and spirally move down to the bottom of the vessel. Light components move towards the center of the vessel and may be discharged via an outlet. However, Hydrocylone devices have difficulty in separating particulates from effluents with more than two phases, and have an associated pressure drop issue that is undesirable in many oilfield situations.

In Canadian Patent Number 2,433,741, issued Feb. 3, 2004, and in Canadian Patent Number 2,407,554, issued Jun. 20, 2006, both assigned to the Applicant of the subject patent application, a desander is disclosed having an elongate, horizontal vessel with an inlet at one end and an outlet at the other end. The fluid inlet is adapted for connection to a fluid stream F, which typically comprises a variety of phases including gas G, some liquid L and entrained particulates P such as sand. The fluid stream F containing particulates P enters through the inlet end and is received by a freeboard portion. The freeboard area is set by a downcomer flow barrier, or a weir. Accordingly, the velocity of the fluid stream F slows to a point below the entrainment or elutriation velocity of at least a portion of the particulates P in the fluid stream. Given sufficient horizontal distance without interference, the particulates P eventually fall from the freeboard portion. Particulates P and liquids L accumulate over time in a belly portion under the freeboard portion, and the desanded fluid stream, typically liquid L and gas G, emanates from the fluid outlet.

The accumulated particulates in the vessel require periodical clean-out at sufficient intervals to ensure that the maximum accumulated depth does not encroach on the fluid outlet. However, for larger vessels, manual cleaning becomes difficult and time consuming.

Therefore, there continues to exist the desire of further improving capacity, separation efficiency and the ease with which the vessel with can be cleaned.

SUMMARY

It is an objective of this disclosure to provide a desanding device for removing particulates from a fluid stream.

According to one aspect, there is provided a desanding device for removing at least particulates from a multiple-phase fluid stream containing at least gas and entrained particulates. The desanding device comprises: a vessel, at least a portion of the vessel forming a treatment chamber, the treatment chamber having a fluid inlet for receiving the fluid stream; and a recovery chamber having: a first, upper port in fluid communication with an upper portion of the treatment chamber for receiving gas therefrom, a second, lower port in fluid communication with a lower portion of treatment chamber, and a fluid outlet intermediate the first and second ports for discharging at least particulate-removed gas out of the treatment chamber.

In one embodiment, the recovery chamber is external to the vessel.

In one embodiment, the recovery chamber is a conduit, said conduit in fluid communication with the treatment chamber via the first and second ports.

In one embodiment, the recovery chamber is located within the vessel in fluid communication with the treatment chamber via the first and second ports.

In one embodiment, the treatment chamber is a first portion of the vessel and the recovery chamber is a second portion of the vessel, the first and second portions of the vessel are separated by a baffle, and the first and second ports are on the baffle.

In one embodiment, the recovery chamber is a conduit within the vessel.

In one embodiment, a first portion of the recovery chamber is external to the vessel and a second portion of the recovery chamber is located within the vessel.

In one embodiment, the fluid outlet is at an elevation lower than the fluid inlet.

In one embodiment, the cross-sectional area of the recovery chamber is much smaller than the cross-sectional area of the treatment chamber.

In one embodiment, the treatment chamber comprises a side wall, said side wall having a non-zero inclination angle $\alpha$ with respect to a horizontal plane.

In one embodiment, the inclination angle $\alpha$ is between about 25° and about 90°.

In one embodiment, the inclination angle $\alpha$ is between about 30° and about 90°.

In one embodiment, the inclination angle $\alpha$ is about 45°.

In one embodiment, the treatment chamber further comprises a particulate drain for removing particulate from said treatment chamber.

In one embodiment, the particulate drain comprises a horizontally oriented body.

In one embodiment, the particulate drain further comprises a transition section, the transition section having an inclined bottom wall with an inclination angle $\gamma$ greater than zero and smaller than the inclination angle $\alpha$.

In one embodiment, the fluid stream further comprises liquid.

In one embodiment, the fluid inlet extends adjacent to or along a bottom wall of the vessel.

In one embodiment, the recovery chamber receives liquid through the second port.

In one embodiment, a freeboard interface is formed in the recovery chamber and the treatment chamber at the elevation of the fluid outlet.

In one embodiment, the fluid inlet extends to an elevation such that a discharge end of the fluid inlet is at about the freeboard interface.

In one embodiment, the treatment chamber further comprises an elongated shroud receiving therein the fluid inlet, said shroud extending along the treatment chamber and having an upper opening at an elevation above the fluid outlet and a lower opening below the fluid outlet.

In one embodiment, the treatment chamber further comprises a flow barrier between the fluid inlet and the first port for directing the fluid stream thereabout.

According to one aspect, there is provided a method of removing at least particulates from a multiple-phase fluid stream containing at least gas and entrained particulates. The method comprises: establishing a treatment chamber in a vessel; establishing a recovery chamber; said recovery chamber in fluid communication with an upper portion of the treatment chamber via a first, upper port for receiving gas therefrom, and said recovery chamber in fluid communication with a lower portion of treatment chamber via a second, lower port; injecting, via a fluid inlet, said fluid stream into the treatment chamber to allow at least a substantial amount of the entrained particulates fall out of the fluid stream and move into a lower portion of the treatment chamber; and discharging the particulate-removed gas via a fluid outlet, said fluid out let intermediate the first and second ports.

In one embodiment, said establishing the recovery chamber further comprises: establishing the recovery chamber external to the vessel.

In one embodiment, said establishing the recovery chamber further comprises: establishing the recovery chamber using a conduit external to the vessel, said conduit in fluid communication with the treatment chamber via the first and the second ports.

In one embodiment, said establishing the recovery chamber further comprises: establishing the recovery chamber within the vessel.

In one embodiment, said establishing the treatment chamber in the vessel further comprises: establishing the treatment chamber using a first portion of vessel; and said establishing the recovery chamber further comprises: establishing the recovery chamber using a second portion of vessel, said first and second portions of the vessel being separated by a baffle, and the first and second ports being on the baffle.

In one embodiment, said establishing the recovery chamber further comprises: establishing the recovery chamber using a conduit within the vessel.

In one embodiment, said establishing the recovery chamber further comprises: establishing a first portion of the recovery chamber external to the vessel; and establishing a second portion of the recovery chamber within the vessel.

In one embodiment, said discharging the particulate-removed gas via the fluid outlet further comprises: discharging the particulate-removed gas via the fluid outlet, said fluid outlet intermediate the first and second ports, and at an elevation lower than the fluid inlet.

In one embodiment, said establishing the recovery chamber further comprises: establishing the recovery chamber having a cross-sectional area much smaller than that of the treatment chamber.

In one embodiment, the method further comprises: tilting said vessel at a non-zero inclination angle α with respect to a horizontal plane.

In one embodiment, the method further comprises: tilting said vessel at a non-zero inclination angle α between about 25° and about 90° with respect to a horizontal plane.

In one embodiment, the method further comprises: tilting said vessel at a non-zero inclination angle α between about 30° and about 90° with respect to a horizontal plane.

In one embodiment, the method further comprises: tilting said vessel at a non-zero inclination angle α of about 45° with respect to a horizontal plane.

In one embodiment, the method further comprises: establishing a particulate drain coupled to a lower portion of the treatment chamber; and discharging particulates accumulated in the lower portion of the treatment chamber via the particulate drain.

In one embodiment, said establishing the particulate drain further comprises: establishing the particulate drain coupled to the lower portion of the treatment chamber, the particulate drain comprising a horizontally oriented body.

In one embodiment, said establishing the particulate drain further comprises: establishing the particulate drain coupled to the lower portion of the treatment chamber, the particulate drain comprising a horizontally oriented body and a transition section, the transition section having an inclined bottom wall with an inclination angle γ greater than zero and smaller than the inclination angle α.

In one embodiment, the fluid stream further comprises liquid.

In one embodiment, the method further comprises: extending the fluid inlet along a bottom wall of the vessel.

In one embodiment, the method further comprises: directing liquid into the recovery chamber through the second port.

In one embodiment, the method further comprises: forming a freeboard interface in the recovery chamber and the treatment chamber at the elevation of the fluid outlet.

In one embodiment, the method further comprises: extending the fluid inlet to an elevation such that a discharge end of the fluid inlet is about the freeboard interface.

In one embodiment, the method further comprises: extending the fluid inlet into an elongated shroud, said shroud extending along the treatment chamber and having an upper opening at an elevation above the fluid outlet and a lower opening below the fluid outlet.

In one embodiment, the method further comprises: establishing a flow barrier in the treatment chamber between the fluid inlet and the first port for directing the fluid stream thereabout.

According to one aspect, there is provided a device for removing at least particulates from a multiple-phase fluid stream containing gas, liquid and entrained particulates, and for separating gas and liquid. The device comprises: a vessel having a fluid inlet for receiving the fluid stream; a gas outlet at an upper portion of the vessel; a liquid outlet spaced from the gas outlet and at an elevation therebelow; and a shroud receiving therein the fluid inlet and having a first, upper opening in fluid communication with an upper portion of the vessel for flowing gas from the fluid inlet into the upper portion of the vessel, and a second, lower opening in fluid communication with the vessel at an elevation below the liquid outlet. In one embodiment, the device further comprises a liquid level controller for controlling the liquid level at about or below a discharge end of the fluid inlet.

BRIEF DESCRIPTION OF THE DRAWINGS

FIG. 2 is a cross-sectional view of an embodiment of a tilted or inclined desander;

FIGS. 3A and 3B are perspective representations of the volumes of the belly portion and freeboard portions of the inclined desander of FIG. 2;

FIG. 4 is a cross-sectional view of another embodiment of an inclined desander having a greater inclination angle than that of FIG. 2;

FIG. 5 is a cross sectional view of a curved fluid inlet, square to the desander, and having a long radius angular transition elbow between orthogonal piping and the inclined desander;

FIG. 21 is a cross-sectional view of a desanding device according to an alternative embodiment, the desanding device is similar to that of FIG. 19 except that the vessel comprises a tapering, conical shaped lower portion;

FIG. 22 is a cross-sectional side view of a desanding device according to an alternative embodiment, the desanding device is similar to that of FIG. 21 except that the fluid inlet is oriented generally horizontally and tangential to the side wall of the vessel;

FIG. 23 is a cross-sectional top view of the desanding device of FIG. 22;

DETAILED DESCRIPTION

A desanding device is typically inserted between, or as a replacement for, existing piping such as connecting piping coupled to a wellhead and downstream equipment such as piping, valves, chokes, multiphase separators and other downstream equipment. The use of the desanding device may be of fixed term, during high sand production, or more permanent.

Figure 1:
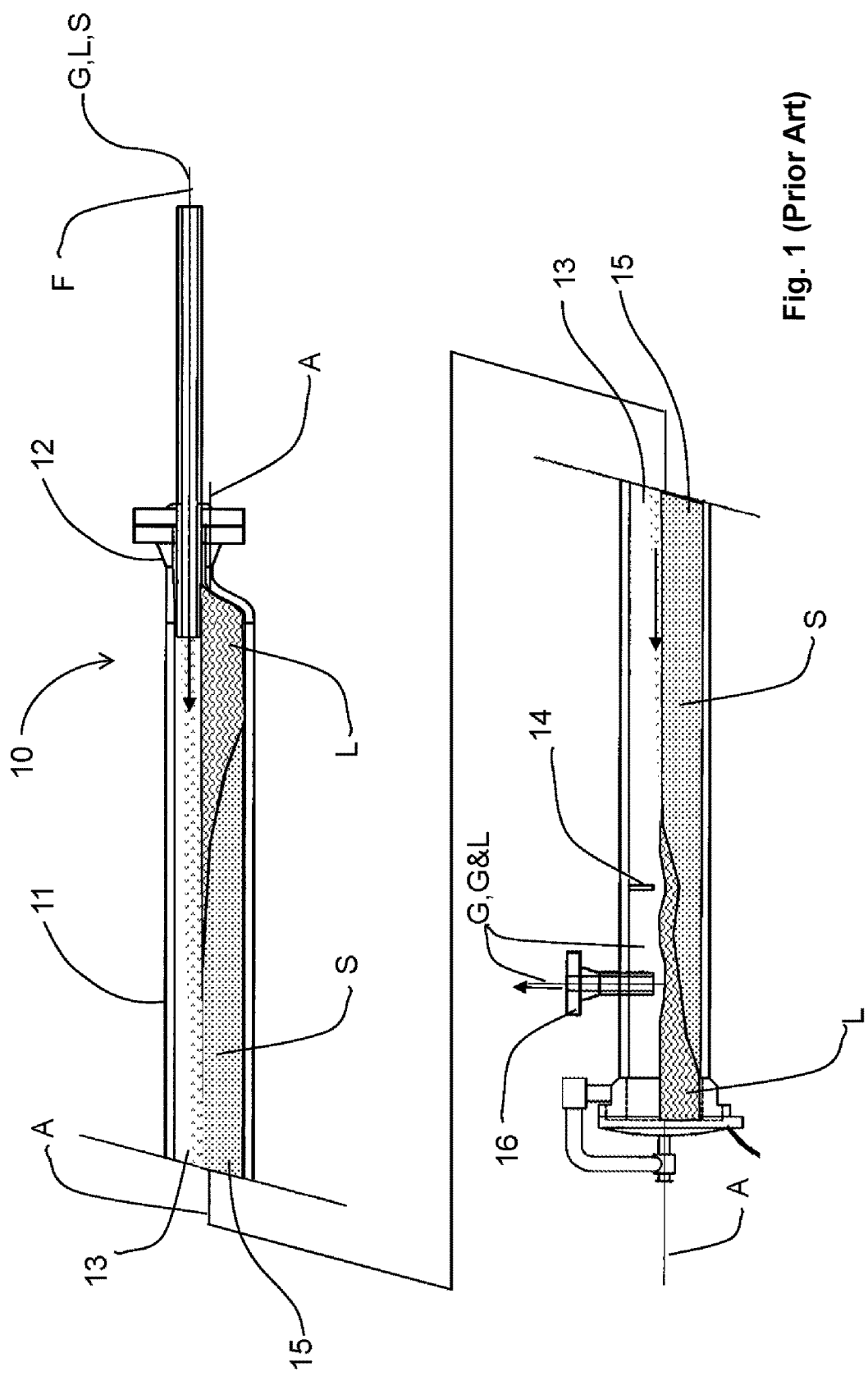
FIG. 1 is a cross-sectional side view of Applicant's prior art elongated horizontal desander illustrating downcomer flow barrier, fluid streams, falling trajectory of particulates, and accumulations of separated liquid, particulates and particulate-free fluid discharge.

As shown in FIG. 1, a prior art horizontal desander comprises a cylindrical pressure vessel 11 having a substantially horizontal axis A, a first fluid inlet end 12 adapted for connection to the fluid stream F. The fluid stream F typically comprises a variety of phases including gas G, some liquid L and entrained particulates such as sand S. The fluid stream F containing sand S enters through the inlet end 12 and is received by a freeboard portion 13. In the illustrated prior art vessel, the freeboard area is set by a downcomer flow barrier 14. Accordingly, the velocity of the fluid stream F slows to a point below the entrainment or elutriation velocity of at least a portion of the particulates S in the fluid stream. Given sufficient horizontal distance without interference, the particulates S eventually fall from the freeboard portion 13. Particulates S and liquids L accumulate over time in the belly portion 15 and are periodically cleaned out at sufficient intervals to ensure that the maximum accumulated depth does not encroach on the freeboard portion 13. The desanded fluid stream, typically liquid L and gas G, emanates from fluid outlet 16.

As shown in FIGS. 2 through 7, embodiments of an inclined desander 20 are free of the prior art flow barrier and, through tilting or inclination of the vessel, maximize freeboard upon entry of the flow stream, and reduce liquid flow rates for maximizing settling conditions therein and retention of captured particulates S. Variability of the inclination angle α enables a measure of variability between the respective freeboard and liquid-storing belly portion for adjusting performance.

As shown in FIG. 2, the desander 20 comprises a vessel 22 having an axis A oriented at an angle α to the horizontal H. The desander 20 has a fluid inlet 24 at an upper end 25 for receiving a fluid stream F typically comprising a variety of phases including gas G, some liquid L and entrained particulates such as sand S. In this embodiment, the fluid inlet 24 is oriented parallel to a longitudinal axis A of the vessel 22. A fluid outlet 26 is located along a top 28 of the vessel 22, and spaced from the fluid inlet 24. In an operating state, a liquid interface 32 (also interchangeably denoted as a freeboard interface) forms extending horizontally from about the fluid outlet 26. A belly portion 40 is formed below the interface 32 for containing liquid L and particulates S. A freeboard portion 44 is formed above the interface 32. The fluid inlet 24 discharges into the freeboard 44. Particulate trajectory can be manipulated by positioning and orienting a discharge end 29 of the fluid inlet 24. In one embodiment, the discharge 29 of the inlet 24 can be aligned parallel to the vessel axis A. The inlet 24 or discharge 29 can be oriented in other orientations including above the inclined axis A, or below the axis A.

The interface 32 is a generally obround, freeboard interface between the belly and freeboard portions 40, 44. The obround interface 32 has a distal end 33 adjacent the fluid outlet 26 and a proximal end 34, the location of which is intermediate the fluid outlet 26 and fluid inlet 24 and varies with liquid level and inclination angle α. As a result of the desander 20 inclination, the trajectory of the fluid stream F, from inlet 24, converges with the interface 32. The trajectory for dropping sand S and liquid L into the belly portion 40 is foreshortened, reducing drop out time. The vessel 22 is long enough to space the fluid inlet 24 sufficiently from the interface 32 to minimize turbulence of the liquid L in the belly portion 40, that spacing being dependent upon various design factors including vessel inclination angle α, inlet fluid stream velocity and characteristics.

At a steady state, the maximum level of the interface 32, is controlled at the distal end 33, set by eventual liquid entrainment and discharge at the fluid outlet 26. Gas G discharges at the fluid outlet 26. At steady state, when the liquid level reaches the fluid outlet 26, any oil and other liquids are re-entrained with the gas G exiting at fluid outlet 26. Particulates S continue to be captured in the belly portion 40 until its volumetric capacity is reached.

Connective piping 46, between conventional wellhead and downstream equipment, is typically in rectilinear or orthogonal arrangements. Thus, the angle α of the desander 20 introduces coupling or connection challenges. The connective piping 46 is generally horizontal or vertical and incorporation of the inclined desander 20 requires an adjustment made at the fluid inlet 24 and fluid outlet 26. In many scenarios, with a small inclination angle α, the fluid outlet 26 can be fit to the top 28 of the vessel 22 at angle α, orienting the outlet 26 vertically and thereby obviating the need for an angular transition.

Turning to FIGS. 3A and 3B, the desander 20 is shown diagrammatically split at the interface 32 for illustrating the incrementally increasing volume of the belly portion 40 below and the incrementally decreasing volume of freeboard portion 44, increasing and decreasing as referenced to the feed stream F. The freeboard portion 44 demonstrates a cross-sectional area which diminishes from the fluid inlet 24 to the fluid outlet 26. As shown in FIGS. 2 and 4, a freeboard velocity at the fluid inlet 24 is such that the entrained liquids L and particulates S fall out of the fluid stream F and collect in the storage belly portion 40. The cross-sectional area of the freeboard portion 44, adjacent the fluid inlet 24, is at its greatest for achieving the lowest average inlet velocity for maximum drop out efficiency for particulates S and liquids L. As the freeboard cross-sectional area adjacent the fluid inlet 24 is large and relatively unimpeded by the belly portion 40, the velocity reduction upon discharge is significantly greater than that of Applicant's prior art horizontal desander. Particulate removal is accomplished while minimizing the portion of the vessel allocated to the freeboard portion 44, maximizing the efficiency of that freeboard portion for particulate drop out, and resulting in a greater allocation of the overall portion of the vessel to the belly portion 40 for storage.

Velocity in the freeboard portion 44 increases after a substantial portion of the particulates S have already deposited in the belly portion 40. The cross-sectional area of the belly portion 40 increases towards the fluid outlet 26 and the velocity of liquids accumulating therein diminishes.

With reference again to FIG. 2 and to FIG. 4, in the belly portion, particulates accumulate and flow downvessel at an angle of repose. The accumulation of liquid L and particulates S establishes a downward flow in the belly portion, and as the particulates accumulate and limit the free flow of the liquid L in the belly portion 40, the liquid velocity begins to increase, drawing more particulates S downvessel.

With reference to FIG. 4, the inclination angle α can be adjusted, shown here as an increased angle over that of FIG. 2. At increasing angles α the trajectory of the feed stream impinges the interface 32 at less acute angle, impinges the interface 32 sooner and enables selection of shorter vessels 22 and greater particulate removal efficiency.

Inclination angles α can be adjusted, for a given length of vessel 22, between fluid inlet 24 and fluid outlet 26, to accommodate gas G and liquid L content in the feed fluid stream F. Inclination angles α would generally be in the range of about 2 degrees to about 20 degrees. The shallowest operating angle α is limited by the minimum requirement for a minimum freeboard 44 cross-sectional area adjacent the inlet 24 once the interface 32 builds to about the fluid outlet 26. The steepest operating angle α is limited by the requirement for a minimum storage capacity in the belly portion 40. The minimum inclination angle would be the condition where the inlet 24 is entirely in the gas phase of the freeboard portion 44 and the gas phase at the discharge is of zero height. The maximum inclination angle would be the condition where the inlet 24 is well above the freeboard interface allowing substantial freeboard to handle slug flow. Angles above 45 degrees limit the performance of desander considerably since the residence time of the liquid phase in the belly portion 40 is reduced.

With reference to FIGS. 4 and 5, the fluid inlet 24, exposed to entrained particulates S in the fluid stream, is subject to greatest risk of erosion. While the inlet 24 can be integrated with the vessel 22, one can also provide an inlet 24 or discharge 29 that is replaceable for ease of maintenance. Options include accepting eventual wear and shutdown of the desander 20 for replacement of an integrated inlet 24; modifying the material or configuration of the inlet 24 to prolong service life, or using replaceable discharge of nozzle for minimizing turnaround time. As stated, one approach is to make the discharge 29 replaceable including incorporating features of a replaceable nozzle as set forth in Applicant's Canadian Patent Number 2,535,215 issued May 8, 2008. A replaceable nozzle 50 can be fit to a compatible coupling at the upper end 25 of the vessel 22. One form of replaceable nozzle 50 comprises the discharge 29, and a threaded connection or nozzle flange 29i, for connection to a compatible threaded connection or flange 24i at the inlet 24 of the vessel 22. The orientation of the discharge is dependent on the coupling 24i, 29i and arrangement of the discharge relative thereto. The replaceable nozzle 50 includes a connecting piping coupling, such as a connective flange 47i for connecting to the piping 47.

To maximize service life, the nozzle 50 can incorporate a curved portion 51, such as a long radius elbow, transition between the orthogonal world of the connecting piping and the inclined axis A of the vessel 22. That curved portion 51 can be integrated with the inlet 24, nozzle 50 or located in advance thereof, such as in a transition pup joint.

In operation, various sizes are desanders are employed in the prior art for differing operational conditions. Prior art desanders 10, such as that described in U.S. Pat. No. 6,983,852 to Applicant, for different feed fluid streams F, might include one typical standard vessel 11 having a nominal 0.3 m (12 inch) diameter by 3.048 m (10 feet) long and another vessel 11 having 0.3 m (12 inch) diameter by 6.096 m (20 feet) long, both of which are fitted with a downcomer weir to set the freeboard portion.

Herein, in the inclined desander 20, the prior art downcomer flow barrier, such as a weir, can be eliminated by providing similar 0.3 m (12 inch) diameter vessels 22 and tilting the upper end 30 of the new desander 20 at about twice the prior art weir height so as to form the interface 32 at the fluid outlet 26. To mimic the minimum operating performance of the 3.048 m (10 feet) and 6.096 m (20 feet) prior art desanders, a 20 foot long inclined vessel 22 would only need to be inclined about ½ the angle $\alpha$ of the 10 foot long inclined vessel 22. Performance can be adjusted by varying the angle.

Figure 6:
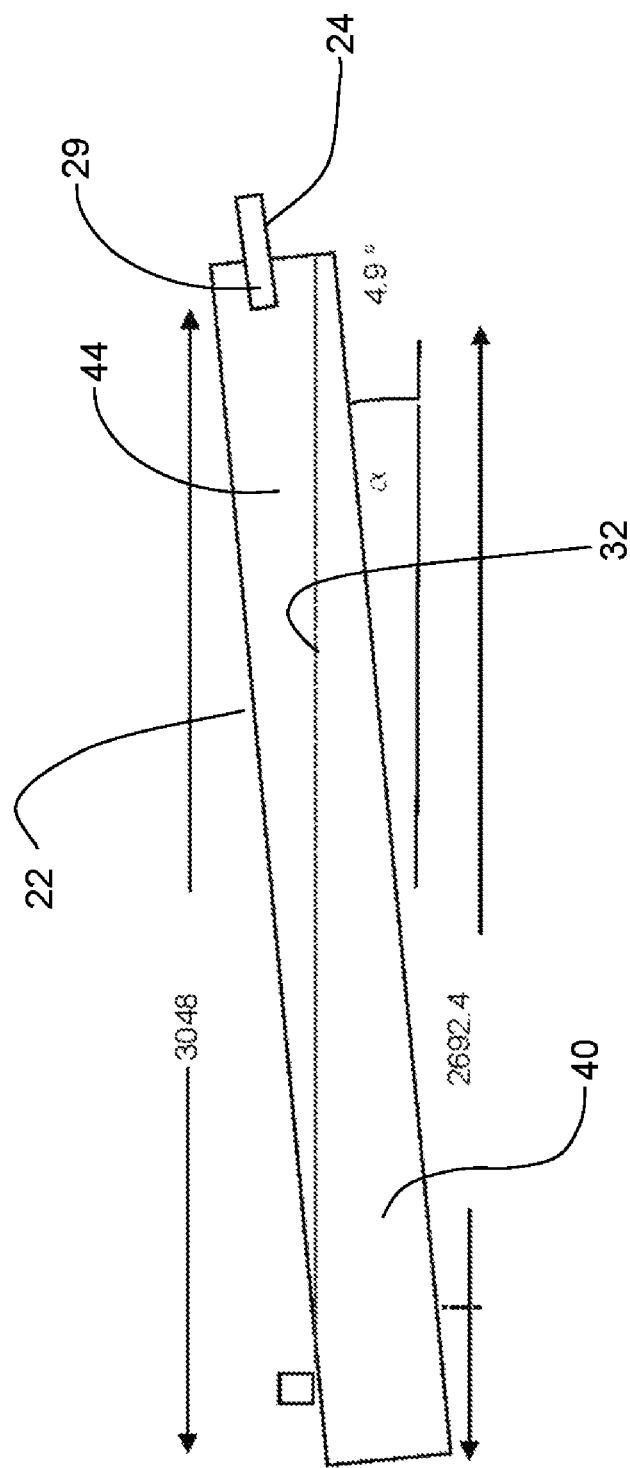
FIG. 6 is a representation of an inclined desander illustrating parameters for an example 12 inch diameter desander handling 50 $m^3/d$ of fluid flow.

As shown in FIG. 6, an example of an inclined desander 20 can receive a fluid stream F of 50 $m^3$/d, bearing particulates S having an average size of 150 um. The fluid stream F can be discharged to vessel 22, having a 0.3 m (1 foot) diameter and 3.048 m (10 feet) long. A typical pressure of the fluid stream F is about 7000 kPa (1015 psia). At an inclination angle $\alpha$ of 4.9 degrees, the freeboard volume is 0.10 $m^3$ and the belly portion is 0.486 $m^3$. The resulting belly portion capacity is about 502 kg of sand particulates.

Figure 7:
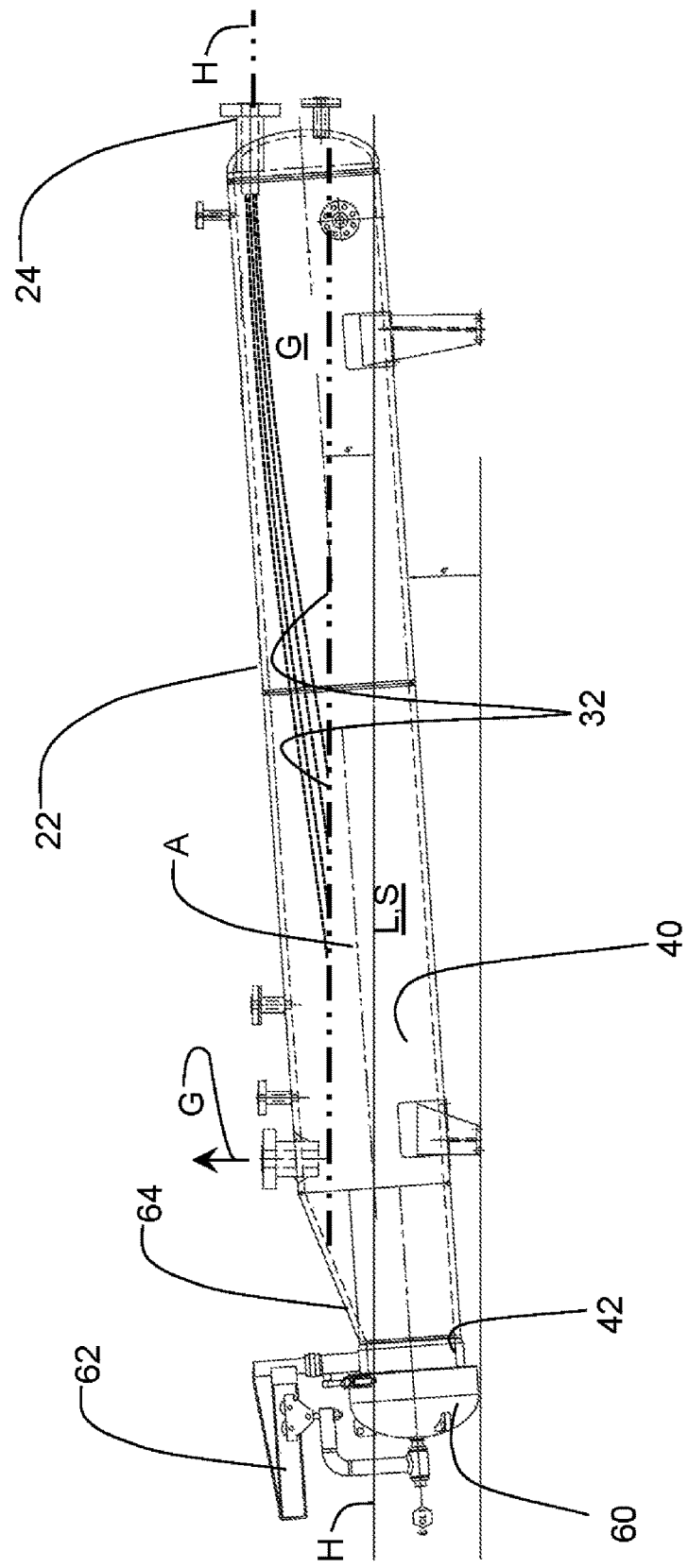
FIG. 7 is a representation of an inclined desander illustrating parameters for an example 36 inch diameter desander having a horizontal fluid inlet.

As shown in FIG. 7, another embodiment of an inclined desander 20 illustrates some additional optional characteristics including a fluid inlet 24 oriented horizontally, the inlet being directly connectable to orthogonal connection piping. The discharge 29 is oriented at an angle to the longitudinal axis A, in this case in a generally horizontal plane, which is angled upwardly from axis A. The initially horizontal trajectory of a substantial portion of the feed stream falls off before engaging the vessel 22. In part, the inlet 24 can be square to the connective pipe as, in this embodiment, the vessel 22 is of sufficient diameter, such as 36 inches, to permit inlet placement in the freeboard 44 while the trajectory is such that it minimizes or avoids vessel wall involvement. As shown, a horizontal spacing between the inlet 24 and inside wall of the vessel 22 is about 1.5 feet.

Removal of accumulated particulates is conducted periodically with the vessel 22 shut in, adjacent the inlet 24 and outlet 26, and depressurized. Conveniently, access can be through a pressure-rated access closure and port at the lower end 42, as the angle of repose and flow in the belly portion carries particulates thereto. A suitable closure is shown in FIG. 1 of the prior art and in FIG. 7 as adapted to the inclined desander 20. The vessel 22 is supported sufficiently high of the ground or otherwise positioned for angular access thereto, such as with scrapers and the like. A pressure vessel, hemispherical head-form of closure 60 can be pivoted from the vessel 22 and counterweighted to close flush to the inclined cylindrical end of the vessel 22. A gantry 62 assists in manipulation of the head for access to the belly portion 40.

Further, the illustrated vessel 22 includes an eccentric end 64 at the lower end 42, to reduce the diameter of the vessel 22 downstream of the fluid outlet 26. Advantages of reducing the vessel diameter at the lower end 42 include adapting to a smaller, more easily manageable or standard form of clean out. As shown the cleanout is a pressure-rated closure 60 supported upon gantry 62. In this embodiment, a 36 inch vessel, having 33 inch internal diameter, is inclined at 4 degrees. The cylindrical portion of the vessel is about 20 feet long with a 3 foot long eccentric portion, reducing the diameter from 3 to about 18 inches for fitting an 18 inch clean out.

Conventional pressure safety valves and other gas phase related devices and instrumentation, not shown, are reliably located in the freeboard portion 44 between the fluid outlet 26 and the upper end 25.

Persons skilled in the art appreciate that various alternative embodiments are possible. As will be described in more detail later, in an alternative embodiment, a desanding device comprises a vessel having a treatment chamber that comprises a fluid inlet, and a recovery chamber that comprises a fluid outlet. The treatment and recovery chambers are in fluid communication by an upper port and a lower port. The treatment chamber receives a multiple-phase fluid stream F therein and separates particulates from gas. Particulates and any liquid are collected in the treatment chamber. Particulate-free gas communicates with the recovery chamber via the upper port for recovery and is discharged at the fluid outlet. Particulate-free liquid, if any, communicates with the recovery chamber via the lower port for recovery and is discharged with the gas at the fluid outlet. A freeboard interface, if any, will form at the elevation of the fluid outlet as particulate-free liquid is carried with the gas stream to downstream equipment. As the recovery chamber and treatment chamber are in fluid communication via the lower port, the freeboard interface also forms in the treatment chamber. The portions of the freeboard interface in the recovery chamber and treatment chamber, respectively, are at substantially the same elevation given the hydraulics of the chambers. The recovery chamber comprises a gas channel connected to the first upper port, and a liquid channel connected to the second lower port, converging at the fluid outlet.

The desanding device receives, via the fluid inlet, a multiphase fluid stream F from the wellhead, and injects the fluid stream F into the treatment chamber. Herein, in this embodiment, the multiphase fluid F typically comprises a variety of phases including gas G, some liquid L such as water and/or oil, and entrained particulates P such as sand.

The fluid stream F injected into the treatment chamber is directed to go along a downward path therein. Because of gravity, particulates P and liquid L fall out of the fluid stream F into the lower portion of the treatment chamber, so called an accumulator portion. As the lower portion of the treatment chamber has an inclination angle greater than the angle of repose of a bank of wet particulates, particulates P migrate from the treatment chamber down into a particulate collection structure. Liquid L is accumulated in the lower portion of the treatment chamber and particulates settle therefrom towards the particulate collection structure. The particulate-free liquid enters the liquid channel of the recovery chamber via the lower port.

Gas G traverses the upper portion of the treatment chamber, so called a freeboard portion, and enters the gas channel via the first upper port or gas port. As the liquid and gas channels are merged of converge at the fluid outlet, liquid and gas are recombined at the fluid outlet and are discharged to downstream equipment. The accumulator portion is separated from the freeboard portion by a freeboard interface referred to in industry as a liquid interface, being an interface between gas G and liquid L. The terms "freeboard interface" and "liquid interface" may be used interchangeably herein.

Compared to the desander of FIGS. 1 to 7, the embodiments disclosed below have advantages including requiring less horizontal operational space and the provision of a large accumulator portion for reduced accumulator or storage velocities for enhanced settling therein and increased particulate storage as necessary.

Figure 8:
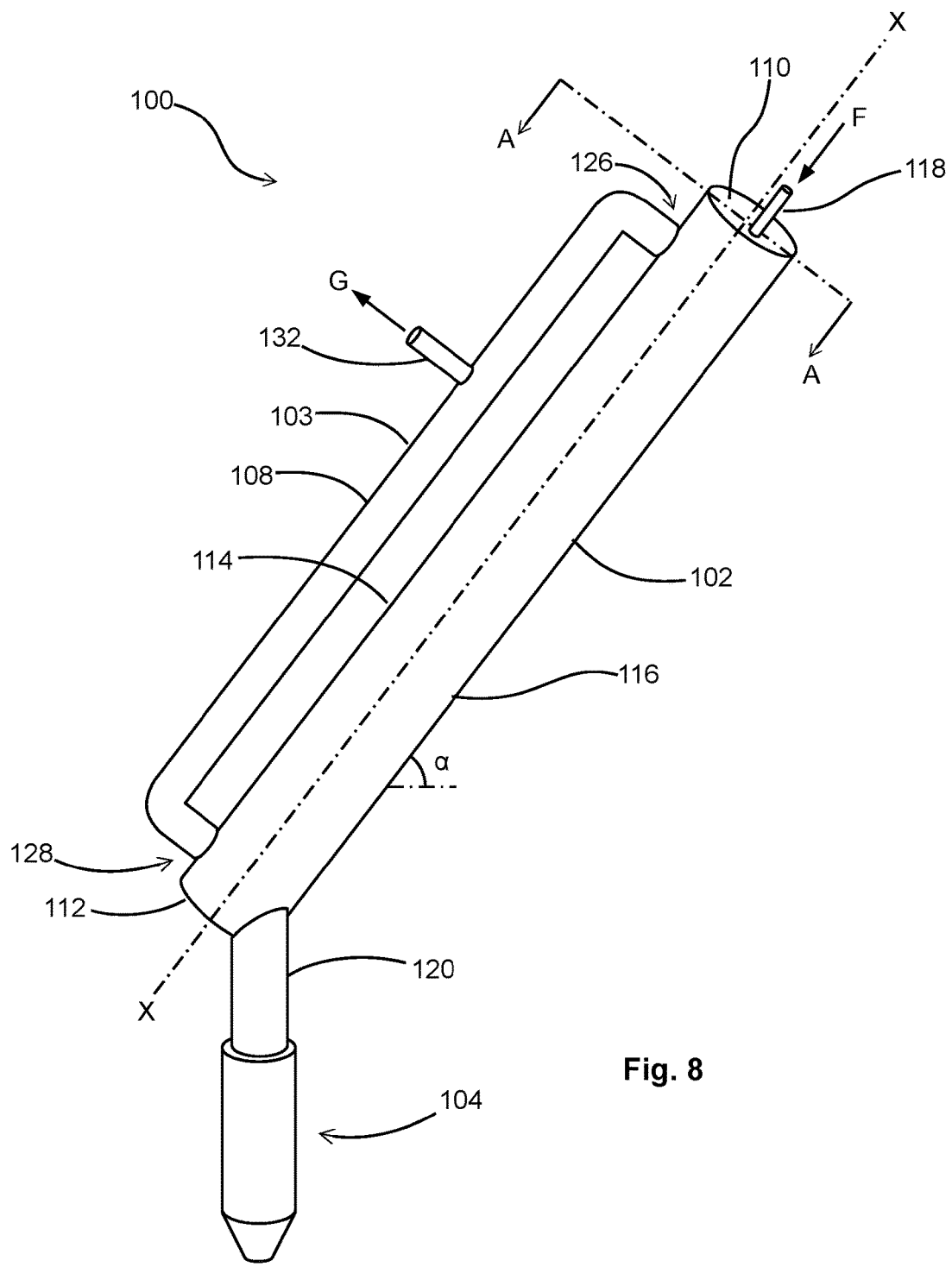
FIG. 8 is a perspective view of a desanding device according to one embodiment, the desanding device comprising an inclined vessel forming a treatment chamber, and an inclined conduit forming a recovery chamber having gas channel and a liquid channel both in fluid communication with the treatment chamber.
Figure 9:
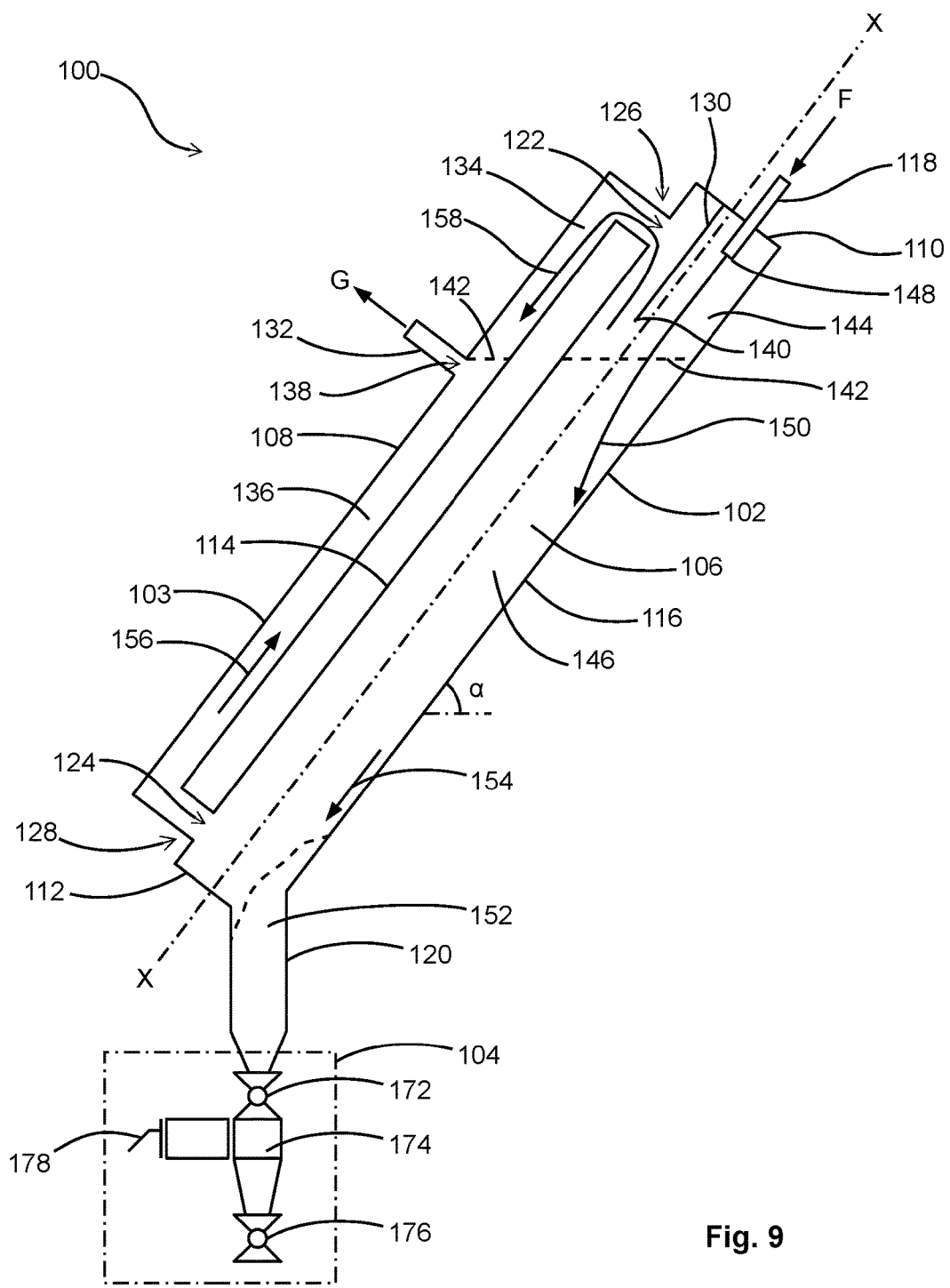
FIG. 9 is a cross-sectional view of the desanding device of FIG. 8 along section A-A.

With reference to FIGS. 8 and 9, in one embodiment, a desanding device 100 is presented for separating multiphase fluid stream injected therein. The desanding device 100 comprises a vessel 102 for receiving a multiphase fluid stream F. In this embodiment, the vessel 102 is an inclined, elongated cylindrical container with a volume sufficient for removing particulates from the fluid injected therein. In particular, the vessel 102 comprises a cylindrical bounding wall terminated at opposing upper and lower end walls 110 and 112. A portion of the bounding wall forms a top wall 114 and a portion thereof forms a bottom wall 116. In other words, the vessel 102 is a cylindrical vessel having top and bottom heads, typically hemispherical for pressure service, or suitable flat heads.

In this embodiment, the vessel 102 is inclined at a predefined angle α greater than the angle of repose of a bank of wet particulates. Hereinafter, the angles introduced in this disclosure are all measured with respect to a horizontal plane. In one embodiment, the inclination angle α is between about 25° and about 90°. In another embodiment, the inclination angle α is between about 30° and about 90°.

In this embodiment, the entire vessel 102 forms a treatment chamber 106 for removing particulates from the multiple-phase fluid stream F injected therein. The vessel 102 comprises a fluid inlet 118 adjacent its upper end wall 110 oriented in a direction generally along the longitudinal axis X-X for receiving the multiphase fluid stream F, and a particulate drain 120 in proximity with its lower end 112 coupling to a particulate collection structure 104. A recovery chamber 103 is provided external and adjacent the vessel 102. The vessel 102 also comprises a first, upper opening or port 122 and a second, lower opening or port 124 along the top wall 114 for fluidly connecting with upper and lower ends 126, 128 respectively of the recovery chamber 103. The recovery chamber is an elongated conduit 108 positioned above the vessel 102 and generally parallel thereto. Where vessel 102 is a pressure vessel, then conduit 108, upper port 126 and lower port 128 are also pressure rated, such as using the appropriate pipe and fittings.

The recovery chamber's conduit 108 is in gas communication with the vessel 102 via the upper port 122 (denoted as the gas port) for gas G to pass through, and in liquid communication with the vessel 102 via the lower port 124 (denoted as the liquid port) for liquid L to pass through. The conduit 108 further comprises a fluid outlet 132 located intermediate the upper and lower ports 126,128 and, as shown, closer to the upper opening 126. The fluid outlet 132 has an intake opening or port 138 for receiving particulate-free gas and liquid.

The opening 138 is an intake port of the fluid outlet 132, while the fluid outlet 132 may take any suitable shape, orientation and length as required. The elevation of the intake opening 138 of the fluid outlet 132 sets a freeboard interface in the recovery and treatment chambers 103,102. The intake port 138 of the fluid outlet 132 defines a freeboard interface 142. The freeboard interface 142 is described in greater detail below. As shown in FIG. 9, the intake port 138 of the fluid outlet 132 is at an elevation below the gas port 122 and the discharge end 148 of the fluid inlet 118 but above the liquid port 124.

The intake port 138 of the fluid outlet 132 divides the recovery chamber 103 into an upper, gas channel 134 from the gas port 122 of the conduit 108 to the intake port 138 of the fluid outlet 132, and a lower, liquid channel 136 from the liquid port 124 of the conduit 108 to the intake port 138 of the fluid outlet 132. Both channels 134 and 136 are in fluid communication with the treatment chamber 106, which is the entirety of vessel 102 in this embodiment, via the gas port 122 and liquid port 124, respectively. The gas and liquid channels 134 and 136 converge at the intake port 138 of the fluid outlet 132, are contiguous and in fluid communication.

As shown in FIG. 9, the treatment chamber 106 comprises therein a flow barrier or downcomer 130 laterally intermediate the fluid inlet 118 and the gas port 122, extending from the upper end wall 110 downwardly along the longitudinal axis X-X to a location vertically intermediate the gas port 122 of the treatment chamber 106 and the intake port 138 of the fluid outlet 132. The axis X-X extends generally from the top wall 114 to the bottom wall 116. The downcomer 130 may be a flat plate, a curved plate or the like that has a length and width sufficient for blocking direct access from the fluid inlet 118 to the gas port 122. Herein laterally refers to spacing perpendicular from the longitudinal axis X-X of the treatment chamber 106. The downcomer 130 eliminates any shortcut path from the fluid inlet 118 to the upper opening 122, and reduces the opportunity that small particulates may flow from the fluid inlet 118 to the upper opening 122.

The intake port 138 of the fluid outlet 132 defines a freeboard interface 142 horizontally extending therefrom and across both the conduit 108 and the treatment chamber 106. The freeboard interface 142 partitions the treatment chamber 106 into a freeboard portion 144 formed thereabove and an accumulator portion 146 formed therebelow. The intake port 138 of the fluid outlet 132 is positioned at a location below the discharge end 148 of the fluid inlet 118, the fluid inlet 118 being directed into the freeboard portion 144.

As described above, the treatment chamber 106 comprises a particulate drain 120 in proximity with its lower end 112 coupling to a particulate collection structure 104. In this embodiment, the particulate collection structure 104 comprises a sand accumulation chamber 174 sandwiched between an inlet valve 172 and a discharge valve 176. Here, the inlet and discharge valves 172 and 176 are rated for sand slurry service.

The inlet valve 172 is connected to the particulate drain 120 on top thereof and to the sand accumulation chamber 174 therebelow, and the sand accumulation chamber 174 is in turn connected to the discharge valve 176 therebelow. The particulate collection structure 104 also comprises a particulate detector 178, e.g., an ultrasonic sand detector, to detect particulate accumulation in the sand accumulation chamber 174.

As will be described in more detail later, the inlet valve 172 may be set to the open position and the discharge valve 176 set to the closed position in normal operation to allow the sand accumulation chamber 174 to collect particulates and liquid from the particulate drain 120.

Conventional pressure safety valves and other gas phase related devices and instrumentation (not shown) may be reliably installed on the vessel 102.

Although not shown in the figures, the vessel 102 is supported by suitable supporting structure to maintain the vessel 102 in its tilted orientation. In some use scenarios, the desanding device 100 is set up at an oil and gas well site. The connective piping of the fluid inlet 118 is connected to a wellhead, and the fluid outlet 132 is connected to downstream equipment.

In operation, the multiphase fluid stream F is injected from the wellhead through the fluid inlet 118 into the treatment chamber 106 downwardly at the angle α. As the fluid inlet 118 has a cross-section area smaller than that of the treatment chamber 106, the velocity of the fluid in the treatment chamber 106 is reduced comparing to that in the fluid inlet 118.

Under the influence of gravity, particulates P and liquid L in the fluid flow fall towards the bottom of the treatment chamber 106 via a trajectory path 150. The trajectory for dropping particulates P and the liquid L is governed by the fluid properties and the geometry of the treatment chamber 106. Once the particulates P and liquid L have dropped into the accumulator portion 146, they remain separated from the active flow stream and form a wet sand bank 152 on the bottom wall 116 of the treatment chamber 106. Such a sand bank 152 is unstable as the slope of the bottom wall 116 of the treatment chamber 106, defined by the inclination angle α, is steeper than the angle of repose of the wet sand bank. Therefore, particulates P and liquid L migrate towards the particulate collection structure 104. To aid in automated removal, the particulates P fall through the open inlet valve 172 into the sand accumulation chamber 174, as indicated by the arrow 154.

After start of operation, liquid L accumulates in the accumulate portion 146, and liquid L and particulates P removed from the fluid stream continue to accumulate therein. Particulates can be periodically removed, however at steady state, liquids accumulate until they reach the fluid outlet 132. Thus, in cases that the fluid stream F contains more liquid L than particulates P, a liquid surface of the accumulated liquid L rises upward towards and forms the freeboard interface 142.

As the inflow of liquid L exceeds removal with accumulated particulates P, the freeboard interface would continue to grow higher but for the fluid outlet 132. Liquid L accumulates in both the treatment chamber and the recovery chamber, hydraulically balanced through lower port 128. Particulate laden liquid dominates in the treatment chamber 106 and particulate-free liquid dominants in the recovery chamber 103. Liquid L from the treatment chamber 106 enters the liquid channel 136, and moves upwardly towards the fluid outlet 132, as indicated by the arrow 156.

Gas G, having been relieved of any particulates therein, traverses the freeboard portion 144, and enters the gas channel 134 via the upper gas port 122 of the treatment chamber 106. Gas G moves down the gas channel 134 towards the fluid outlet 132 as indicated by the arrow 158, and is discharged from the fluid outlet 132 while particulates P and liquid L continue to accumulate in the accumulator portion 146.

Those skilled in the art appreciate that, before the liquid surface reaches the liquid port 124, gas G may also enter the liquid channel 136 from the liquid port 124. Moreover, before the steady state, i.e., before a liquid surface grows to the freeboard interface 142, gas G may also enters the liquid channel 136 from the gas port 122 via the gas channel 134.

As stated, at a steady state, the level of the liquid surface grows to the freeboard interface 142, formed at the intake port 138 of the fluid outlet 132. As liquid inflow continues to exceed liquid associated with particulates P collected at the collection structure 104, incoming oil and other liquids are re-entrained with the gas G exiting at the fluid outlet 132. Such a steady state operations last as long as accumulated particulates are removed, or sufficient accumulate storage volume is provided, so as maintain collected particulates free from the lower liquid port 124. Blockage of the lower port 124 of the recovery chamber 103 signals desanding failure, resulting in particulates being recovered at the fluid outlet 132, endangering the integrity of the downstream equipment and requiring a manual service cleaning cycle. Such desanding failure is prevented by automatically, continuously or periodically removing accumulated particulates from the particulate collection structure 104.

In cases that the fluid stream contains significant fraction of particulates, particulates accumulate quickly. Desanding would be quickly compromised if the accumulated particulates reach and plug the liquid port 124. Such an occurrence is prevented by removing accumulated particulates from the particulate collection structure 104.

The removal of accumulated particulates can be conducted continuously or periodically with the treatment chamber 106 remaining pressurized and in operation. In one embodiment, valves 172 and 176 are controlled manually by an operator or automatically with a timer or an ultrasonic sand detector to periodically open and close. Typically, an interlock is used to prevent the inlet and discharge valves from being open at the same time. In particular, the valve 172, between the treatment chamber 106 and the sand accumulation chamber 174 is normally open except at the time of particulate removal, allowing particulates to fall into the sand accumulation chamber 174. The discharge valve 176 is normally closed except at the time of particulate removal.

To remove particulates while maintaining the desanding device 100 in operation, the valve 172 is first closed. Valve 176 is then opened allowing the particulates contained in the sand accumulation chamber 174 to exit. After removing particulates from the sand accumulation chamber 174, valve 176 is closed and valve 172 is then reopened to allow particulates in the treatment chamber 106 to migrate into the sand accumulation chamber 174. Persons skilled in the art appreciate that the treatment chamber 106 has sufficient space to store particulates therein during the particulates-removing process, and the volume of the sand accumulation chamber 174 is sufficiently large to discharge enough particulates within a cleaning cycle so as not to cause a backup of particulates into valve 172 thereby preventing the valve to close. Both valves 172 and 176 are required to have service rated for abrasive slurries.

As an alternate, substantially continuous removal could be accomplished in a mass balance scenario with an automatic bleed down solids and some liquid as come in using flow of solids level control. Alternatively, periodic opening of a control valve, such as valve 172, could be performed manually, such controlled by visual inspection of the fraction of particulates in the blowdown while the valve is open, and closing once the flow is predominately liquid L. In such scenarios, valve 172 can be left open or cycled open and closed. Accordingly, valve 176 is opened only for a short period of time, or pulsed, sufficient to allow the volume of the sand accumulation chamber 174 to be evacuated, and closed again before the liquid inventory thereabove is exhausted.

In various alternative embodiments, the gas and liquid channels 134 and 136 may be formed in various ways.

Figure 10:
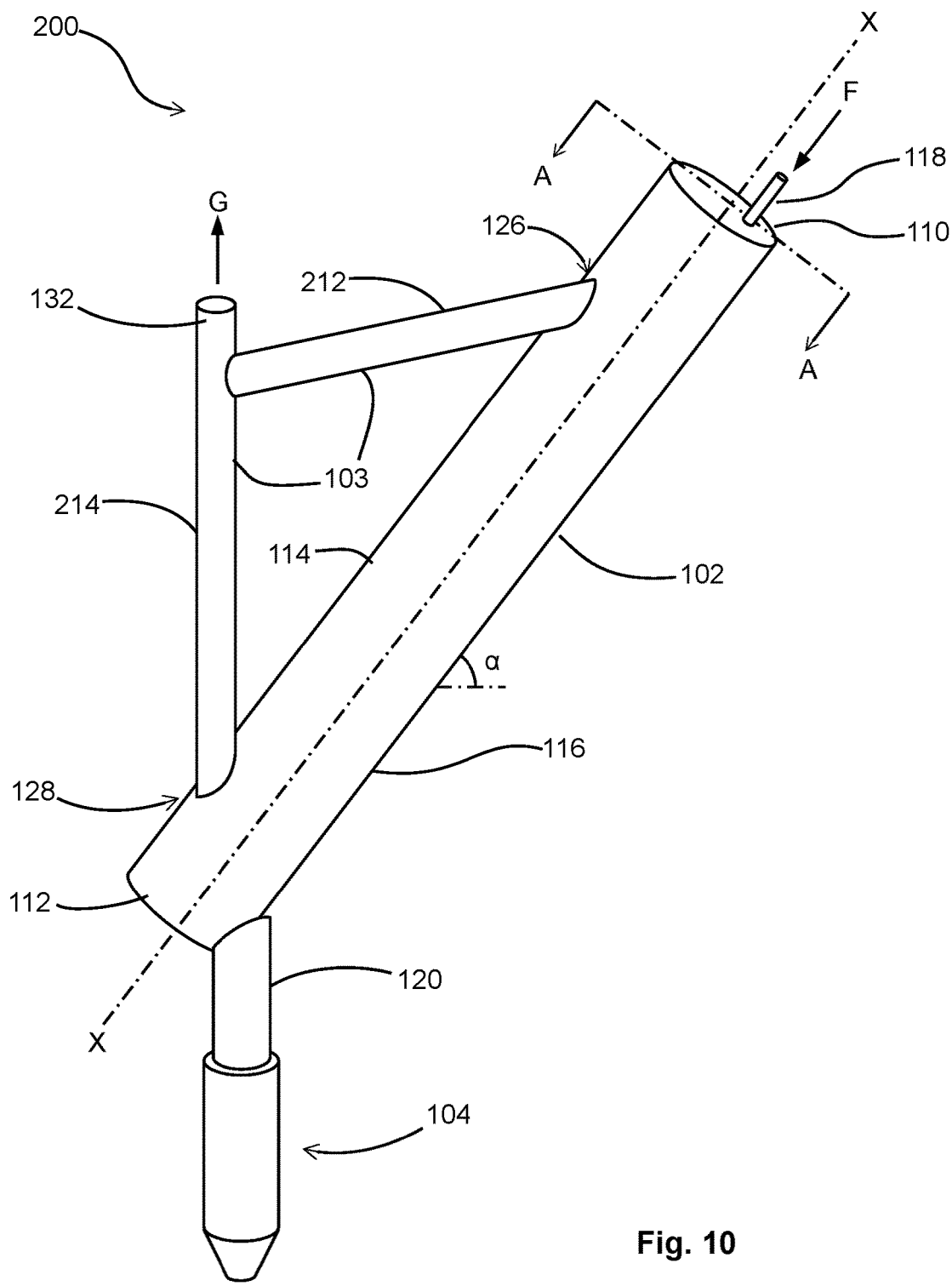
FIG. 10 is a perspective view of a desanding device according to an alternative embodiment, the desanding device comprising an inclined vessel forming a treatment chamber, and a recovery chamber having a gas channel and a liquid channel both in fluid communication with the treatment chamber, the recovery chamber forming a triangular structure with the vessel.
Figure 11:
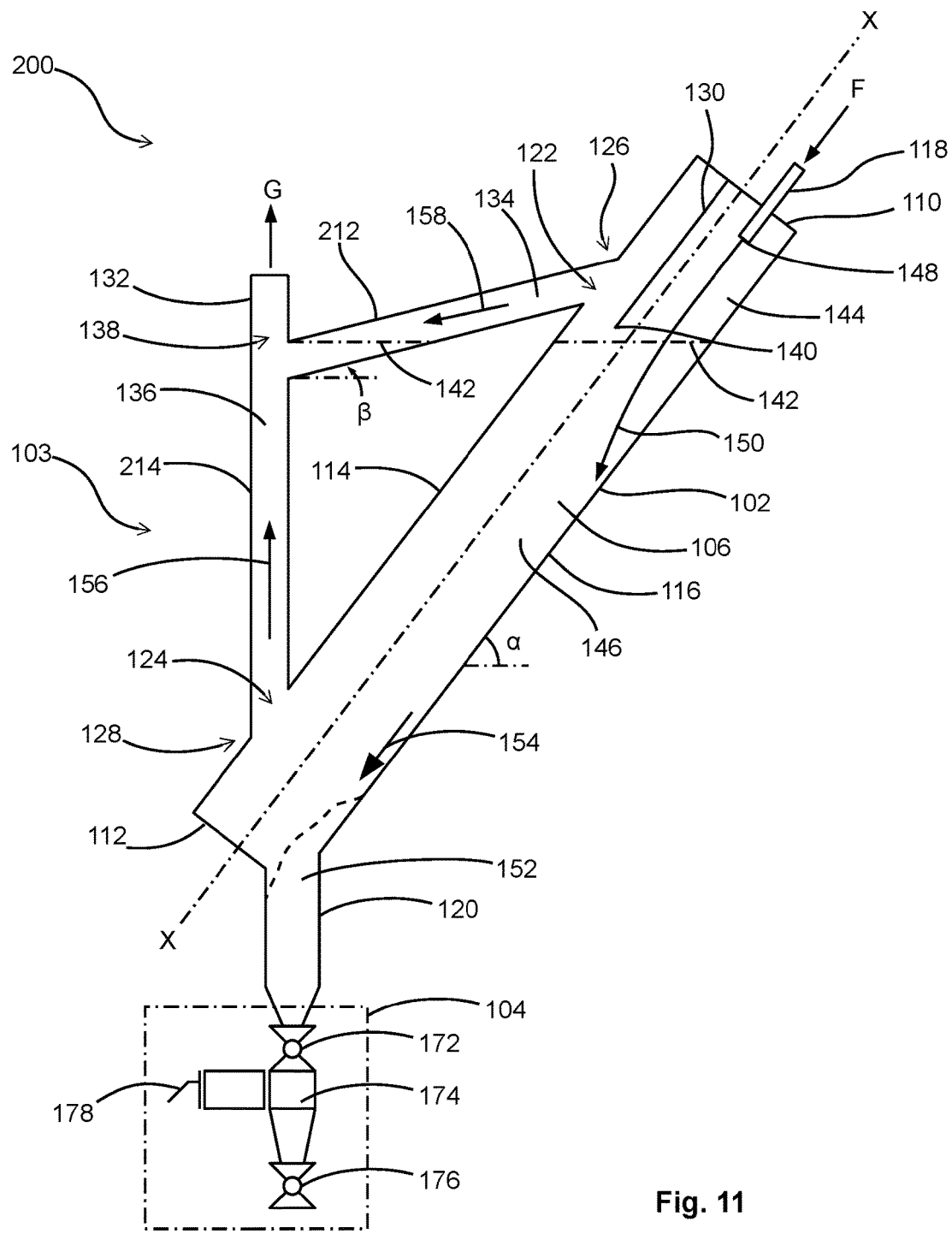
FIG. 11 is a cross-sectional view of the desanding device of FIG. 10 along section A-A.

With reference to FIGS. 10 and 11 a desanding device 200, according to an alternative embodiment, is similar to the desanding device 100 of FIGS. 8 and 9, wherein the entire vessel 102 forms a treatment chamber 106. However, the recovery chamber 103, having the liquid and gas channels 136 and 134, in this embodiment is made of two conduits, which, together with the vessel 102, form a generally triangular structure relative to the vessel 102, the gas channel 134 sloping somewhat to the fluid outlet 132, whilst the liquid channel 136 being substantially vertical.

In this embodiment, the liquid channel 136 is formed by a vertically oriented conduit 214 extending upwardly from the liquid port 124. The conduit 214 comprises an opening 138 near its upper end at a location lower than the gas port 122. A conduit 212 extends from the opening 138 upwardly at an inclination angle β to the gas port 122, forming the gas channel 134. The portion of the conduit 214 from the liquid port 124 to the opening 318 forms the liquid channel 136, and the portion of the conduit 214 from the opening 318 to the upper end thereof forms a fluid outlet 132, with the opening 138 acting as the intake port thereof. The gas and liquid channels 134 and 136 converge at the intake port 138 of the fluid outlet 132, and are in fluid communication therewith.

The intake port 138 of the fluid outlet 132 defines a freeboard interface 142 extending horizontally in the gas channel 134 and the treatment chamber 106. The freeboard interface 142 partitions the treatment chamber 106 into a freeboard portion 144 thereabove and an accumulator portion 146 therebelow.

Similar to the desanding device 100 of FIGS. 8 and 9, the discharge end 148 of the fluid inlet 118 is at an elevation above the intake port 138 of the fluid outlet 132. Also, the treatment chamber 106 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 200 is the same as that of the desanding device 100 of FIGS. 8 and 9.

Figure 12:
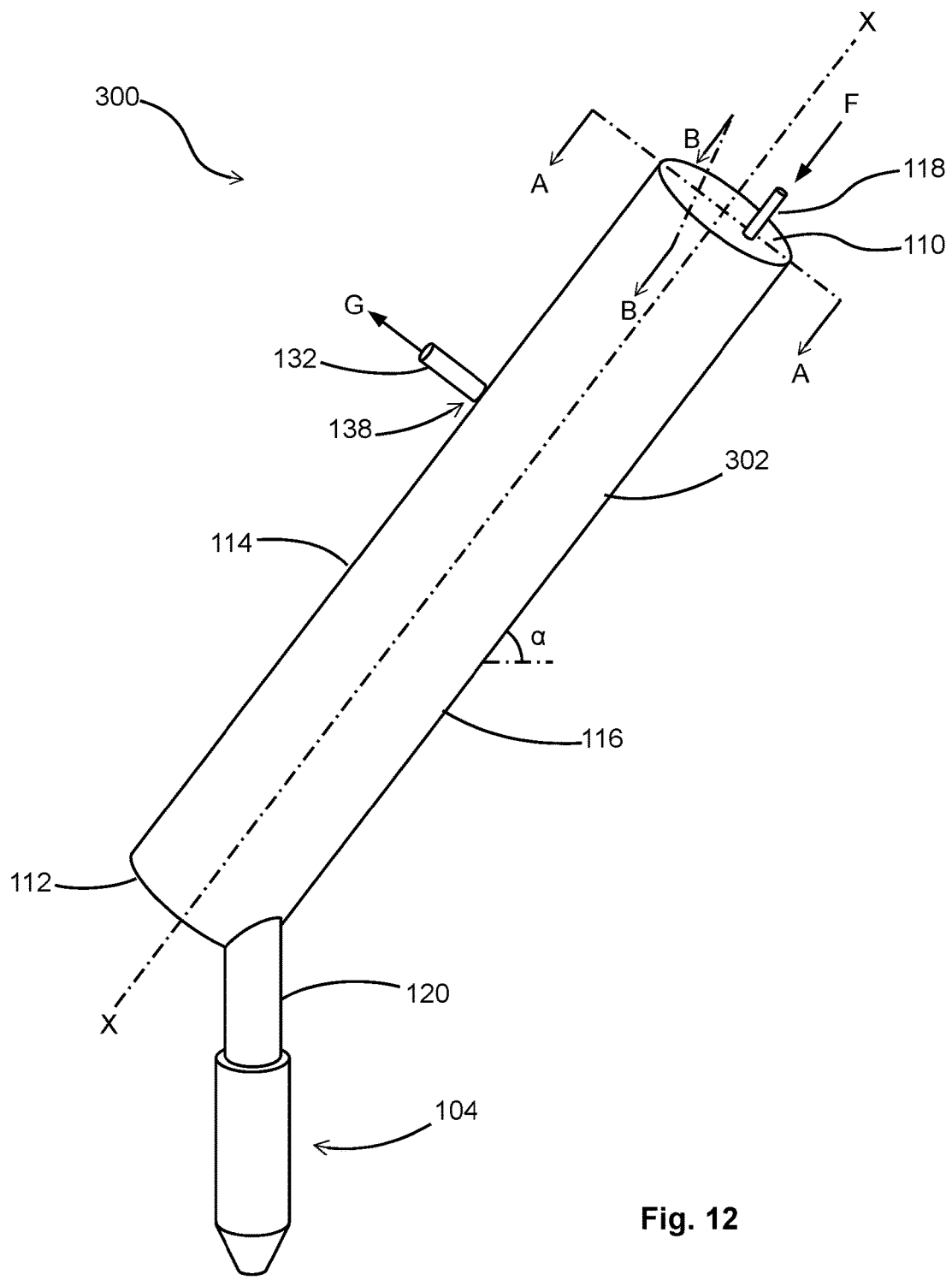
FIG. 12 is a perspective view of a desanding device according to an alternative embodiment, the desanding device comprising an inclined vessel, a baffle in the vessel dividing the vessel into a treatment chamber and a recovery chamber.
Figure 13:
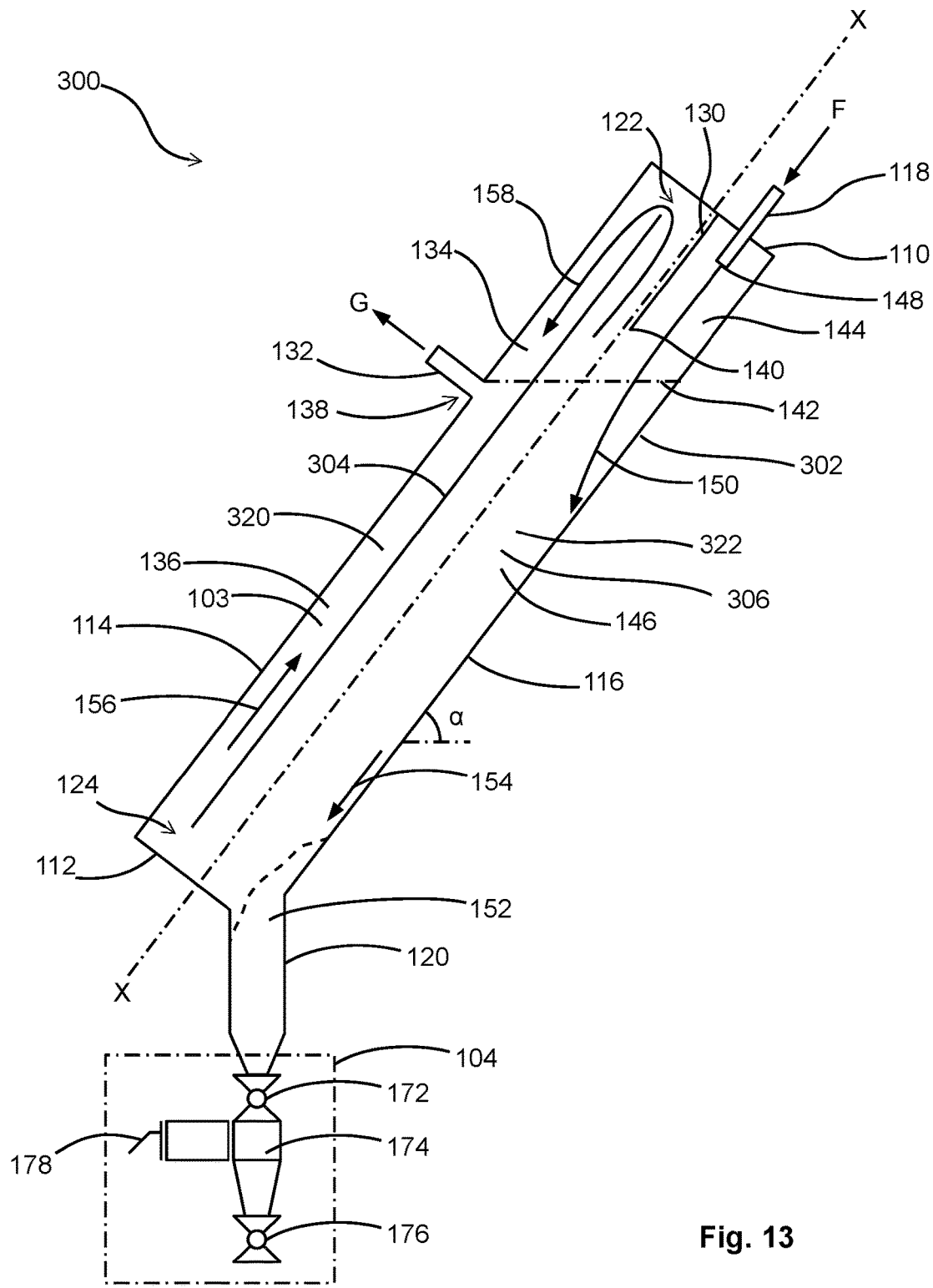
FIG. 13 is a cross-sectional view of the desanding device of FIG. 12 along section A-A.
Figure 14:
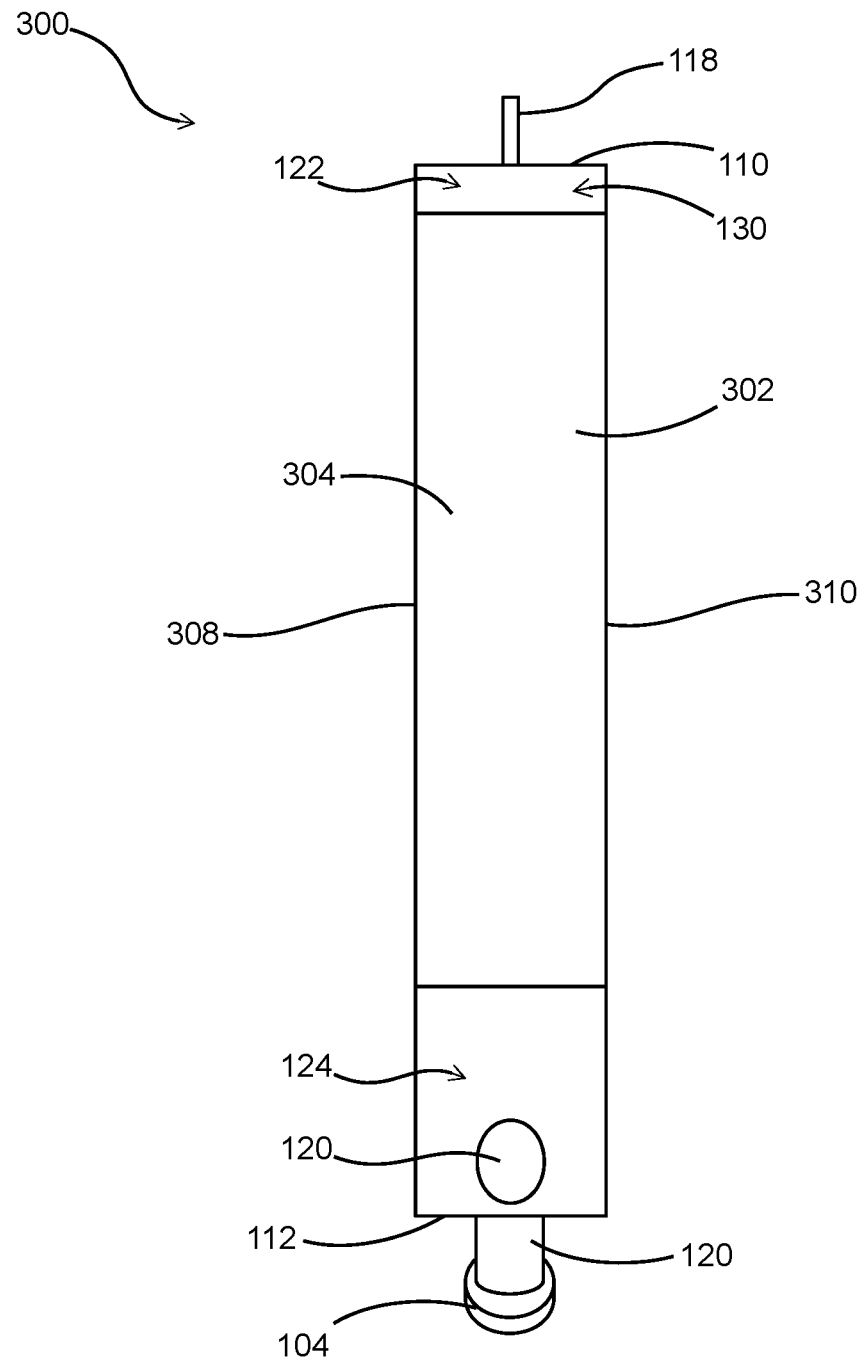
FIG. 14 is a cross-sectional view of the desanding device of FIG. 12 along section B-B.

With reference to FIGS. 12 to 14, a desanding device 300 is shown, according to another embodiment, the device 300 having a recovery chamber 103 comprising a gas and a liquid channel 134 and 136 within the vessel 302. As the gas and liquid channels 134 and 136 are within the vessel 302, displacing treatment chamber volume, the vessel 302 has a larger cross-section than does the vessel 102 of FIGS. 8 and 9 for achieving the same desanding throughput or capacity.

As can be seen, the desanding device 300 comprises a vessel 302 similar to the vessel 102 of FIGS. 8 and 9. The vessel 302 is an elongated cylindrical container inclined at a predefined inclination angle α greater than the angle of repose of a bank of wet particulates. Similar to the vessel 102 of FIGS. 8 and 9, the vessel 302 comprises a top wall 114, a bottom wall 116, an upper end wall 110 and a lower end wall 112.

In this embodiment, the vessel 302 comprises therein a baffle 304 extending from a position adjacent to the top end 110 of the vessel 302 downwardly in a direction generally along the inclined longitudinal axis X-X to a position adjacent to the bottom end 112 thereof, and extending laterally from one side wall 308 of the vessel 302 to the other side wall 310 thereof (see FIG. 14).

The baffle 304 divides the vessel 302 to an upper portion 320 thereabove and a lower portion 322 therebelow, the lower portion 322 having a cross-sectional area much larger than that of the upper portion 302. The upper and lower portions 320 and 322 are in fluid communication via an upper, gas port 122, i.e., the gap between the baffle 304 and the upper end wall 110 of the vessel 302, and a lower, liquid port 124, i.e., the gap between the baffle 304 and the lower end 112 of the vessel 302.

The upper portion 320 of the vessel 302 comprises a fluid outlet 132 on the top wall 114 near the upper end wall 110 with an intake port 138 at an elevation below the gas port 122 but above the liquid port 124.

The lower portion 322 of the vessel 302 comprises a fluid inlet 118 at the upper end wall 110 of the vessel 302 oriented in a direction generally along the longitudinal axis X-X for receiving the multiphase fluid stream F. The fluid inlet 118 comprises a discharge end 148 at an elevation above the intake port 138 of the fluid outlet 132.

The lower portion 322 of the vessel 302 forms a treatment chamber 306. A gas channel 134 is formed in the upper portion 320 from gas port 122 to the intake port 138 of the fluid outlet 132. The gas channel 134 is in communication with the treatment chamber 306 via the gas port 122 generally for gas G to pass therethrough. A liquid channel 136 is formed in the upper portion 320 from the liquid port 124 to the intake port 138 of the fluid outlet 132. The liquid channel 136 is in communication with the treatment chamber 306 via the liquid port 124 generally for liquid L to pass therethrough. The gas and liquid channels 134 and 136 converge at the intake port 138 of the fluid outlet 132, and are in fluid communication therewith.

The intake port 138 of the fluid outlet 132 defines a freeboard interface 142 extending horizontally in the gas channel 134 and the treatment chamber 306. The freeboard interface 142 partitions the treatment chamber 306 into a freeboard portion 144 thereabove and an accumulator portion 146 therebelow.

Similar to the desanding device 100 of FIGS. 8 and 9, the treatment chamber 306 of the desanding device 300 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 300 is the same as that of the desanding device 100 of FIGS. 8 and 9.

In an alternative embodiment, the baffle 304 extends from the top end wall 110 of the vessel 302 downwardly in a direction generally along the inclined axis X-X to the bottom end wall 112 thereof, and extending from one side wall 308 of the vessel 302 to the other side wall 310 thereof. The baffle 304 comprising an upper hole adjacent to the upper end wall 110 of the vessel 302, forming the upper, gas port 122, and a lower hole adjacent to the lower end 112 of the vessel 302, forming the lower, liquid port 124. Other aspects of the desanding device in this embodiment is the same as the desanding device 300 of FIGS. 12 to 14.

Figure 15:
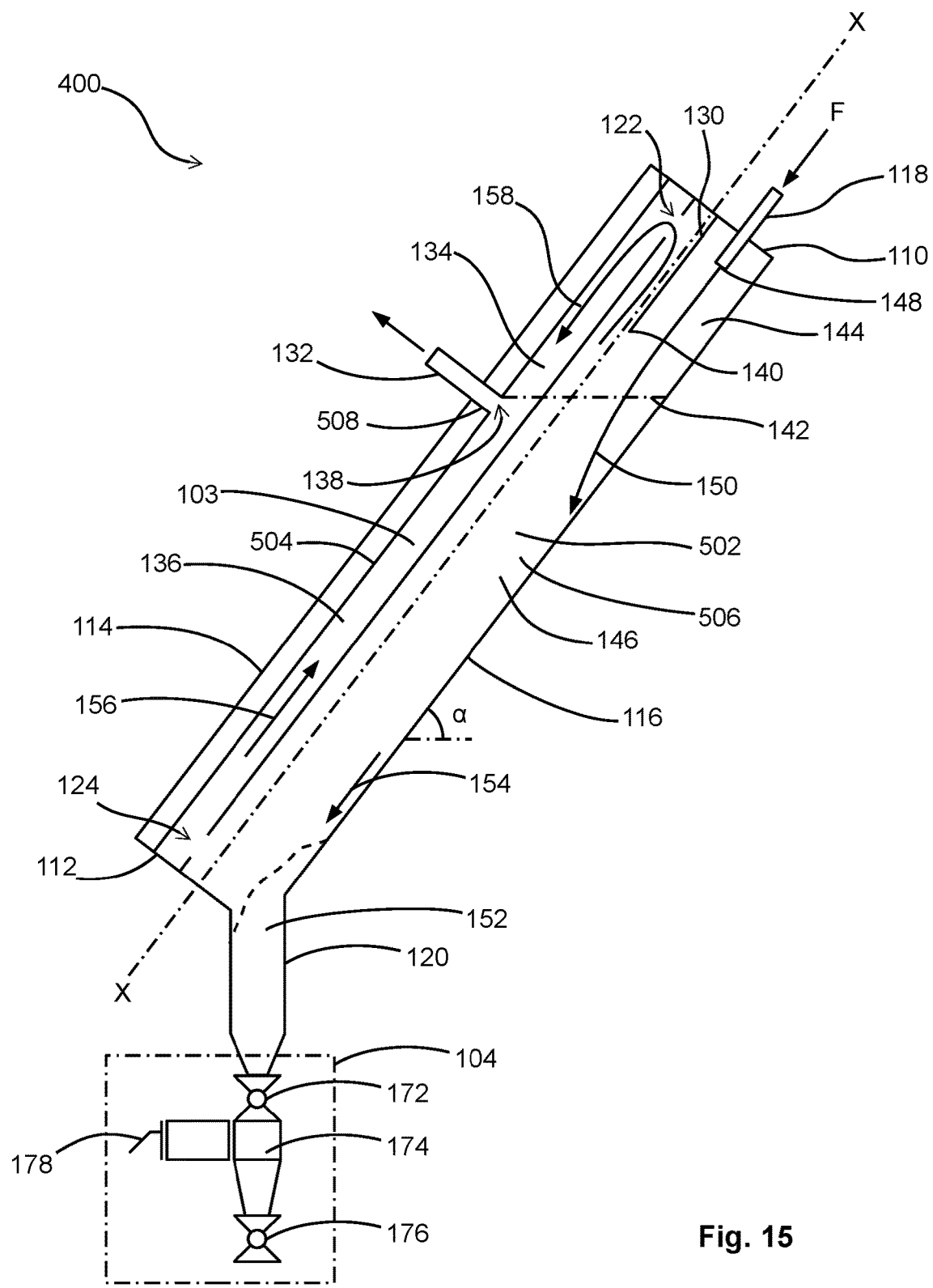
FIG. 15 is a cross-sectional view of a desanding device according to an alternative embodiment, the desanding device comprising an inclined vessel and a conduit received in the vessel for forming a recovery chamber, and defining a treatment chamber between the vessel and the conduit, the recovery chamber having a gas and a liquid channel in fluid communication with the treatment chamber.

FIG. 15 shows a cross-sectional view of a desanding device 400 according to yet another embodiment. Similar to the desanding devices described above, the desanding device 400 comprises an elongated vessel 502 inclined at a predefined angle α greater than the angle of repose of a bank of wet particulates. The vessel 502 receives therein an elongated conduit 504 extending from the upper end wall 110 along the axis X-X of the vessel 502 to the lower end wall 112. The conduit 504 has a cross-sectional area much smaller than that of the vessel 502, and comprises an upper, gas port 122 adjacent its upper end, and a lower, liquid port 124 adjacent its lower end. The conduit 504 further comprises a fluid outlet 508 coupling to a fluid outlet 132 of the vessel 502. The fluid outlet 508 comprise an intake port 138 on the conduit 504 at an elevation intermediate the gas and liquid ports 122 and 124, and below the discharge end 148 of the fluid inlet 118.

The conduit 504 forms the recovery chamber 103 comprising the gas and liquid channels 134 and 136. In particular, the upper, gas channel 134 is formed by the portion of the conduit 504 from the gas port 122 to the intake port 138 of the fluid outlet 508, and the liquid channel 136 is formed by the portion of the conduit 504 from the liquid port 124 to the intake port 138 of the fluid outlet 508. The gas and liquid channels converge at the intake port 138 of the fluid outlet 508, and are in fluid communication therewith.

The conduit 504 also defines a treatment chamber 506 being the annulus between the vessel 502 and the conduit 504, i.e., the interior space of the vessel 502 outside the conduit 504. The treatment chamber 506 is in communication with the gas channel 134 via the gas port 122 and in communication with the liquid channel 136 via the liquid port 124.

The intake port 138 of the fluid outlet 508 defines a freeboard interface 142 horizontally extending therefrom and across the gas channel 134 and the treatment chamber 506. The freeboard interface 142 partitions the treatment chamber 506 into a freeboard portion 144 thereabove and an accumulator portion 146 therebelow.

Similar to the desanding device 100 of FIGS. 8 and 9, the treatment chamber 506 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 400 is the same as that of the desanding device 100 of FIGS. 8 and 9.

Figure 16:
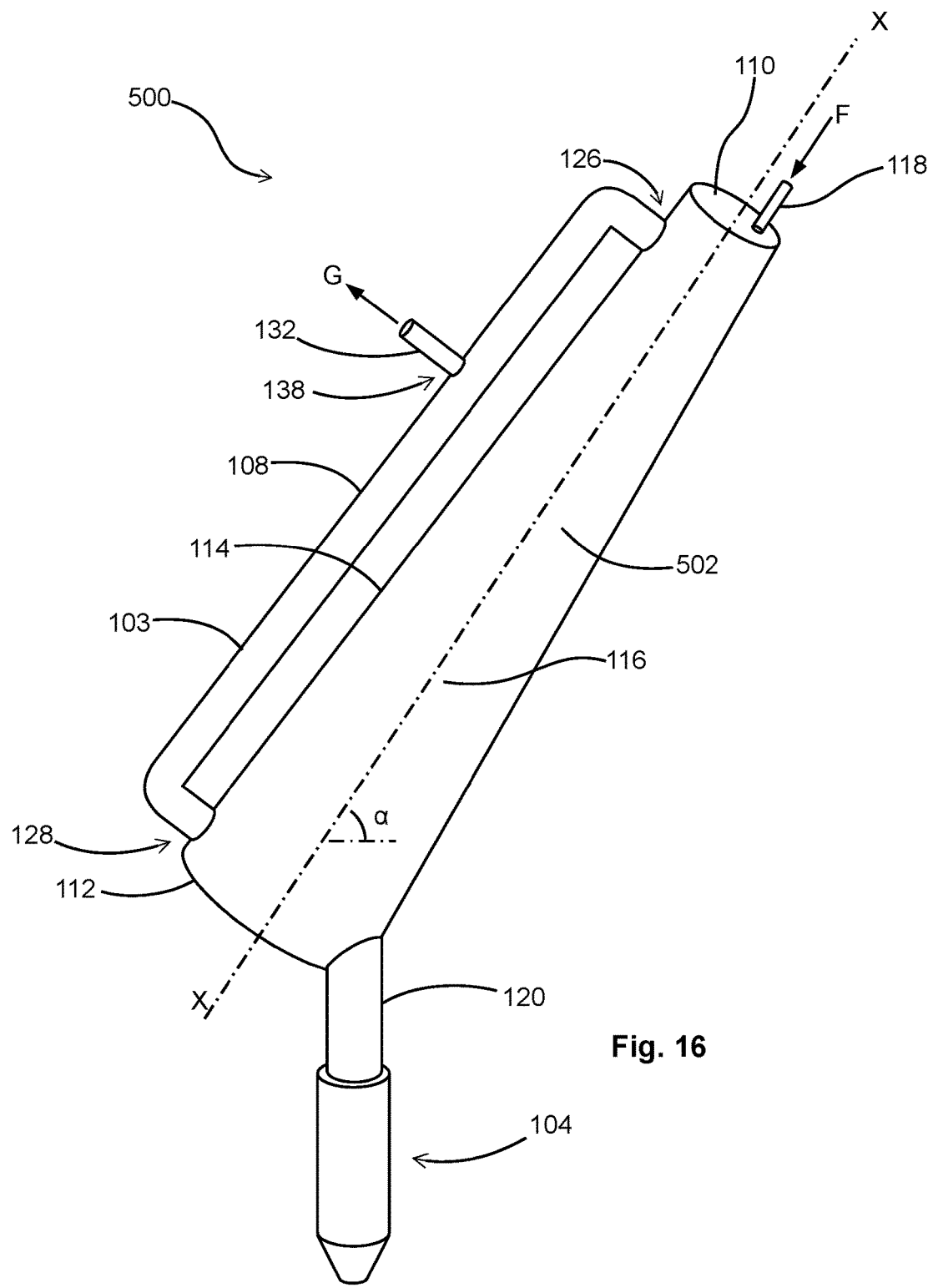
FIG. 16 is a perspective view of a desanding device according to an alternative embodiment, the desanding device comprising an inclined, conical shaped vessel forming a treatment chamber, and an inclined conduit forming a recovery chamber.

Although in above embodiments, the vessel is a cylindrical tube, those skilled in the art appreciate that the vessel may alternatively have a different shape such as a frustum or conical shape, a cubic shape or the like, in accordance with the particular design and pressure-resistance requirements. FIG. 16 shows a desanding device 500 that is the same as the desanding device 100 of FIGS. 8 and 9 except that the vessel 502 in this embodiment has a frustum shape with the lower end wall 112 larger than the upper end wall 110. Of course, those skilled in the art appreciate that, in an alternative embodiment, the vessel 502 may have a frustum shape with the lower end wall thereof larger than the upper end wall thereof.

Figure 17:
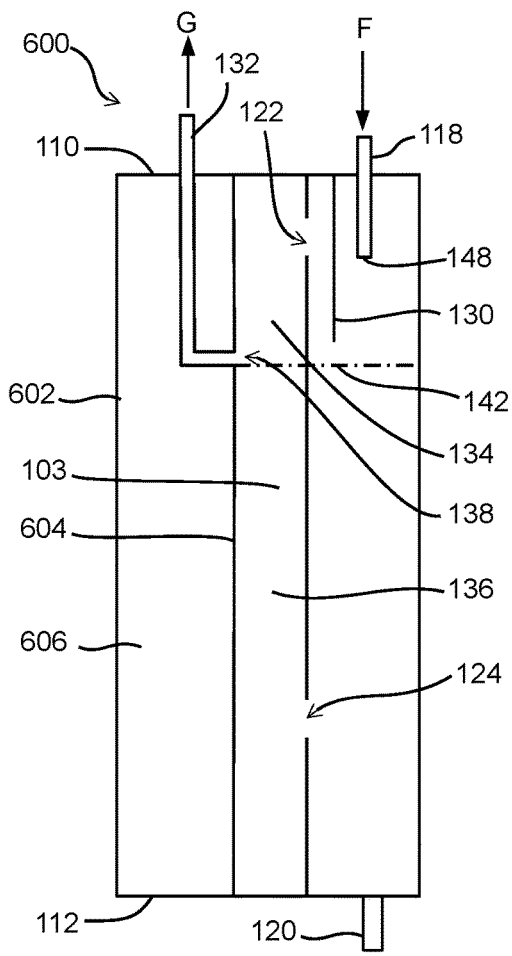
FIG. 17 is a cross-sectional view of a desanding device according to an alternative embodiment, the desanding device comprising a vertically oriented vessel and a vertically oriented conduit extending from the top wall of the vessel to the bottom wall thereof, the conduit forming a recovery chamber and defining a treatment chamber between the vessel and the conduit.

In some alternative embodiments, the vessel may be vertically oriented, i.e., having an inclination angle α of 90°. For example, FIG. 17 shows a desanding device 600 according to one embodiment. In this example and the examples hereinafter, the particulate collection structure is not shown for the ease of illustration.

The desanding device 600 comprises a vertically oriented vessel 602 receiving therein an also vertically oriented conduit 604 extending from the top wall 110 of the vessel 602 to the bottom wall 112 thereof. The conduit 604 has a cross-sectional area much smaller than that of the vessel 602, and comprises an upper, gas port 122 and a lower, liquid port 124. A fluid outlet 132 extends downwardly into the vessel 602 from the top wall 110 thereof and couples to the conduit 604 at an intake port 138.

The conduit 604 forms the recovery chamber 103 comprising the gas and liquid channels 134 and 136. In particular, the upper, gas channel 134 is formed by the portion of the conduit 604 from the gas port 122 to the intake port 138 of the fluid outlet 132, and the liquid channel 136 is formed by the portion of the conduit 604 from the liquid port 124 to the intake port 138 of the fluid outlet 132. The gas and liquid channels converge at the intake port 138 of the fluid outlet 132, and are in fluid communication therewith.

The conduit 604 also defines a treatment chamber 606 being the annulus between the vessel 602 and the conduit 604, which is in communication with the gas channel 134 via the gas port 122 and in communication with the liquid channel 136 via the liquid port 124.

The intake port 138 of the fluid outlet 132 defines a freeboard interface 142. The treatment chamber 606 comprises a fluid inlet 118 extending downwardly from the top wall 110 of the vessel 602 with a discharge end 148 above the intake port 138 of the fluid outlet 132.

In this embodiment, the treatment chamber 606 further comprises therein a downcomer 130 laterally intermediate the fluid inlet 118 and the gas port 122, extending from the upper end wall 110 downwardly to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122.

Figure 18:
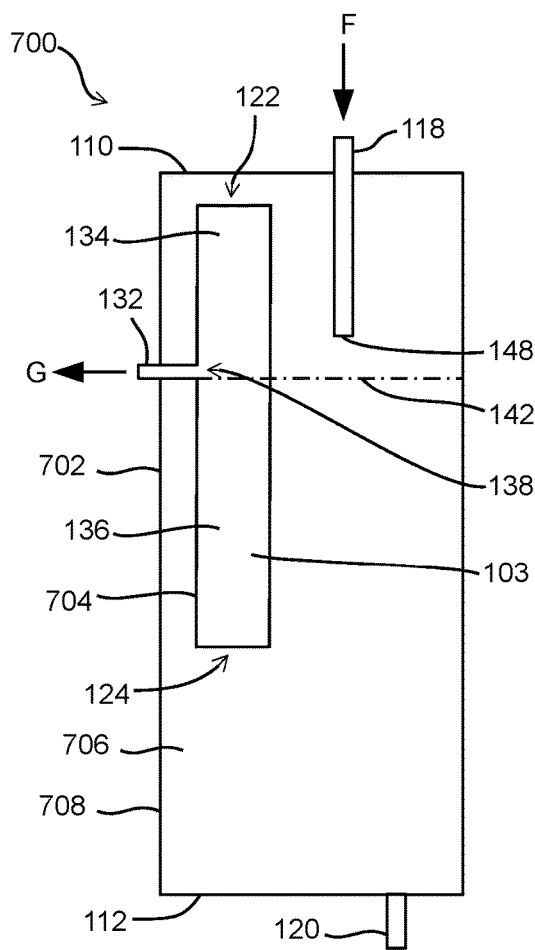
FIG. 18 is a cross-sectional view of a desanding device according to an alternative embodiment, the desanding device comprising a vertically oriented vessel and a vertically oriented conduit extending from a location proximate the top wall of the vessel to a location proximate the bottom wall thereof, the conduit forming a recovery chamber and defining a treatment chamber between the vessel and the conduit.

In some alternative embodiments, the vessel may not comprise a downcomer 130 for blocking direct access from the fluid inlet 118 to the gas port 122. For example, FIG. 18 shows a desanding device 700 according to one embodiment. The desanding device 700 comprises a vertically oriented vessel 702 receiving therein a vertically oriented conduit 704 extending from a location proximate the top wall 110 of the vessel 702 to a location proximate the bottom wall 112 thereof, forming the recovery chamber 103. The conduit 704 has a cross-sectional area much smaller than that of the vessel 702, and comprises an upper, gas port 122 and a lower, liquid port 124. A fluid outlet 132 extends from an intake port 138 on the conduit 704 radially outwardly to the side wall 708 of the vessel 700.

The intake port 138 of the fluid outlet 132 divides the conduit 704 or recovery chamber 103 into an upper, gas channel 134 from the gas port 122 of the conduit 704 to the intake port 138 of the fluid outlet 132, and a lower, liquid channel 136 from the liquid port 124 of the conduit 108 to the intake port 138 of the fluid outlet 132. The conduit 704 also defines a treatment chamber 706 being the annulus between the vessel 702 and the conduit 704.

Both channels 134 and 136 are in fluid communication with the treatment chamber 706 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142.

The treatment chamber 706 comprises a fluid inlet 118 extending downwardly from the top wall 110 of the vessel 702 with a discharge end 148 above the intake port 138 of the fluid outlet 132. In this embodiment, the discharge end 148 is sufficiently spaced from the gas port 122 for preventing direct access from the fluid inlet 118 to the gas port 122. Therefore, the treatment chamber 706 does not comprise any downcomer laterally intermediate the fluid inlet 118 and the gas port 122.

Figure 19:
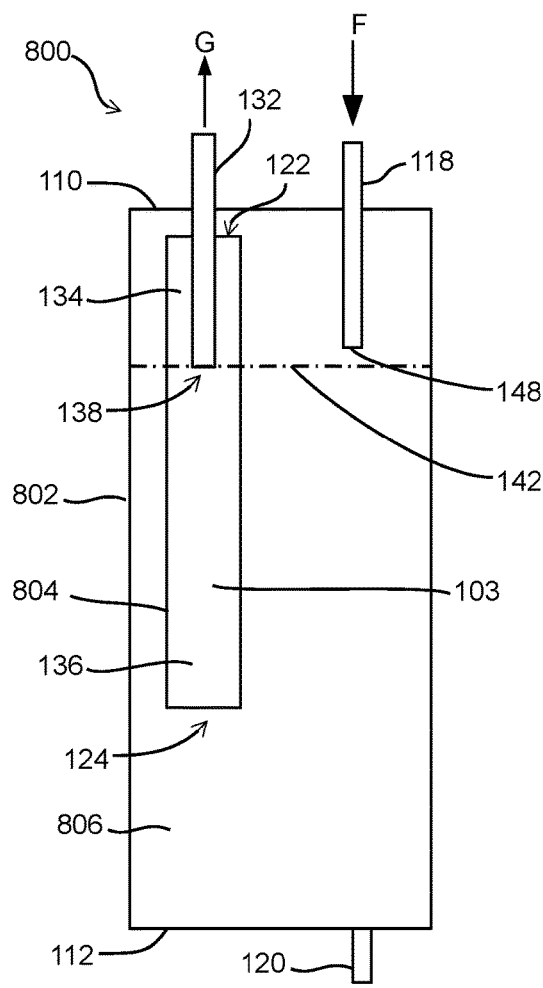
FIG. 19 is a cross-sectional view of a desanding device according to an alternative embodiment, the desanding device is similar to that of FIG. 18 except that an intake end or opening of the fluid outlet is received in the conduit.

FIG. 19 shows a desanding device 800 according to one embodiment. The desanding device 800 comprises a vertically oriented vessel 802 receiving therein a vertically oriented conduit 804 extending from a location proximate the top wall 110 of the vessel 802 to a location proximate the bottom wall 112 thereof, forming the recovery chamber 103. The conduit 804 has a cross-sectional area much smaller than that of the vessel 702, and comprises an upper, gas port 122 and a lower, liquid port 124. A fluid outlet 132 extends from the top wall 110 of the vessel 700 downwardly into the conduit 804 such that an intake port 138 of the fluid outlet 132 is within the conduit 804. In this embodiment, the conduit 804 is laterally located approximate one side of the vessel 802.

The intake port 138 of the fluid outlet 132 divides the conduit 804 or the recovery chamber 103 into an upper, gas channel 134, which is the annulus between the conduit 804 and the fluid outlet 132 from the gas port 122 of the conduit 804 to the intake port 138 of the fluid outlet 132, and a lower, liquid channel 136 from the liquid port 124 of the conduit 108 to the intake port 138 of the fluid outlet 132. The conduit 804 also defines a treatment chamber 806 being the annulus between the vessel 802 and the conduit 804. Both channels 134 and 136 are in fluid communication with the treatment chamber 806 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding device 700 of FIG. 18.

Figure 20:
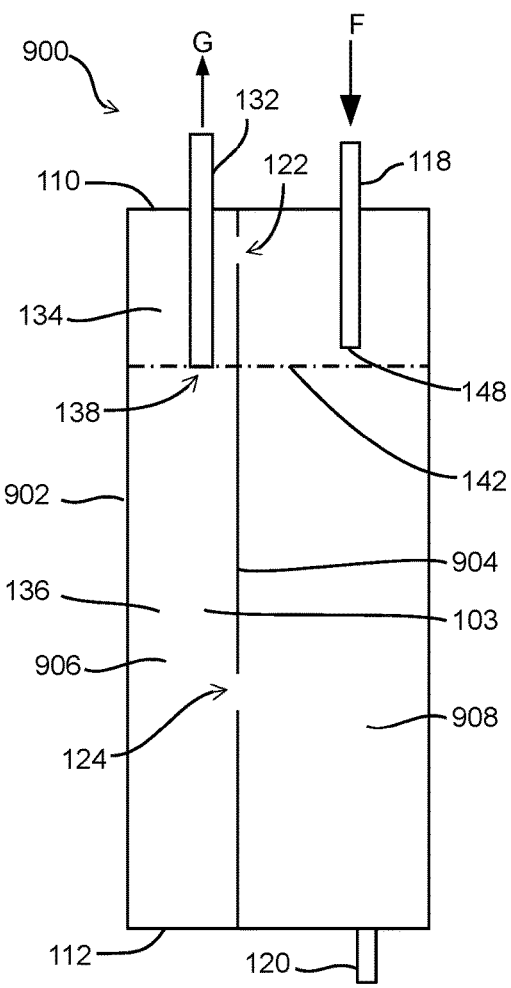
FIG. 20 is a cross-sectional view of a desanding device according to an alternative embodiment, the desanding device comprising a vertically oriented vessel and a vertically oriented baffle in the vessel dividing the vessel into a treatment chamber and a recovery chamber in fluid communication with each other.

As shown in FIG. 20, in an alternative embodiment, the desanding device 900 comprises a vertically oriented vessel 902. A vertically oriented baffle 904 extending from the top wall 110 of the vessel 902 to the bottom wall 112 thereof divides the vessel 902 into a first portion 906 as the recovery chamber 103 and a second portion 908 as the treatment chamber 908, the second portion 908 having a cross-sectional area much larger than that of the first portion 906. The baffle 904 comprises an upper, gas port 122 and a lower, liquid port 124. A fluid inlet 118 extends downwardly from the top wall 110 of the vessel 902 into the second portion 908, and a fluid outlet 132 extends downwardly from the top wall 110 of the vessel 700 into the first portion 906. The intake port 138 of the fluid outlet 132 is at an elevation intermediate the gas port 122 and the liquid port 124. The discharge end 148 of the fluid inlet 118 is at an elevation intermediate the gas port 122 and the intake port 138.

The intake port 138 of the fluid outlet 132 divides the first portion 906 or the recovery chamber 103 into an upper, gas channel 134, which is the annulus between the first portion 906 and the fluid outlet 132 from the gas port 122 of the baffle 904 to the intake port 138 of the fluid outlet 132, and a lower, liquid channel 136 from the liquid port 124 of the baffle 904 to the intake port 138 of the fluid outlet 132. The second portion 908 forms a treatment chamber 908. Both channels 134 and 136 are in fluid communication with the treatment chamber 908 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding device 300 of FIGS. 12 and 13.

As described above, the vessel of the desanding device may have any suitable shape. For example, FIG. 21 shows a desanding device 1000 in an alternative embodiment. The desanding device 1000 is the same as the desanding device 800 of FIG. 19 except that, in this embodiment, the vessel 1002 of the desanding device 1000 has a conical lower portion 1004 tapering downwardly to a bottom wall 112 of a diameter smaller than that of the rest part of the vessel 1002.

In above embodiments, the fluid inlet 118 is oriented generally parallel to the longitudinal axis of the vessel. However, in some alternative embodiments, the fluid inlet 118 may be oriented in other directions.

FIGS. 22 and 23 show a desanding device 1100 in another embodiment. The desanding device 1100 is the same as the desanding device 1000 of FIG. 21 except that, in this embodiment, the vessel 1002 of the desanding device 1100 comprises a fluid inlet 1118 on its side wall 1106. The fluid inlet 1118 is oriented generally horizontally and comprises a discharge end 1120 discharging a fluid stream into the vessel 1002 along a direction generally tangential to the side wall 1106 thereof. In this embodiment, the fluid outlet 132 and the conduit 804 are biased from the horizontal center of the vessel 1002. However, those skilled in the art appreciate that the fluid outlet 132 and the conduit 804 may alternatively be concentric with the vessel 1002.

Figure 24:
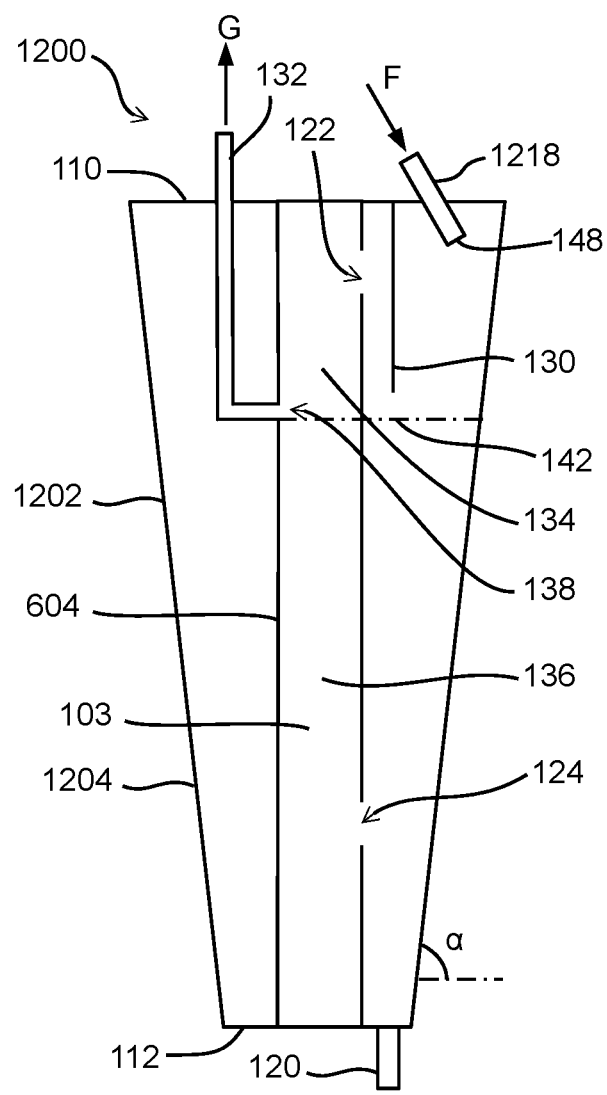
FIG. 24 is a cross-sectional view of a desanding device according to an alternative embodiment, the desanding device comprising a conical shaped vessel and a vertically oriented conduit extending from the top wall of the vessel to the bottom wall thereof, the conduit forming a recovery chamber and defining a treatment chamber between the vessel and the conduit.

FIG. 24 shows a desanding device 1200 in another embodiment. The desanding device 1200 is the same as the desanding device 600 of FIG. 17 except that, in this embodiment, the vessel 1202 has a frustum shape with the top wall 100 larger than the bottom wall 112, and that the fluid inlet 1218 is oriented towards the side wall 1204 of the vessel 1202. In this embodiment, the side wall 1204 has an angle α with respect to a horizontal plane that is greater than the angle of repose of a bank of wet particulates. A disadvantage of the desanding device 1200 is that the fluid stream F discharged from the fluid inlet 1218 impinges the side wall 1204, causing erosion thereto.

Figure 25:
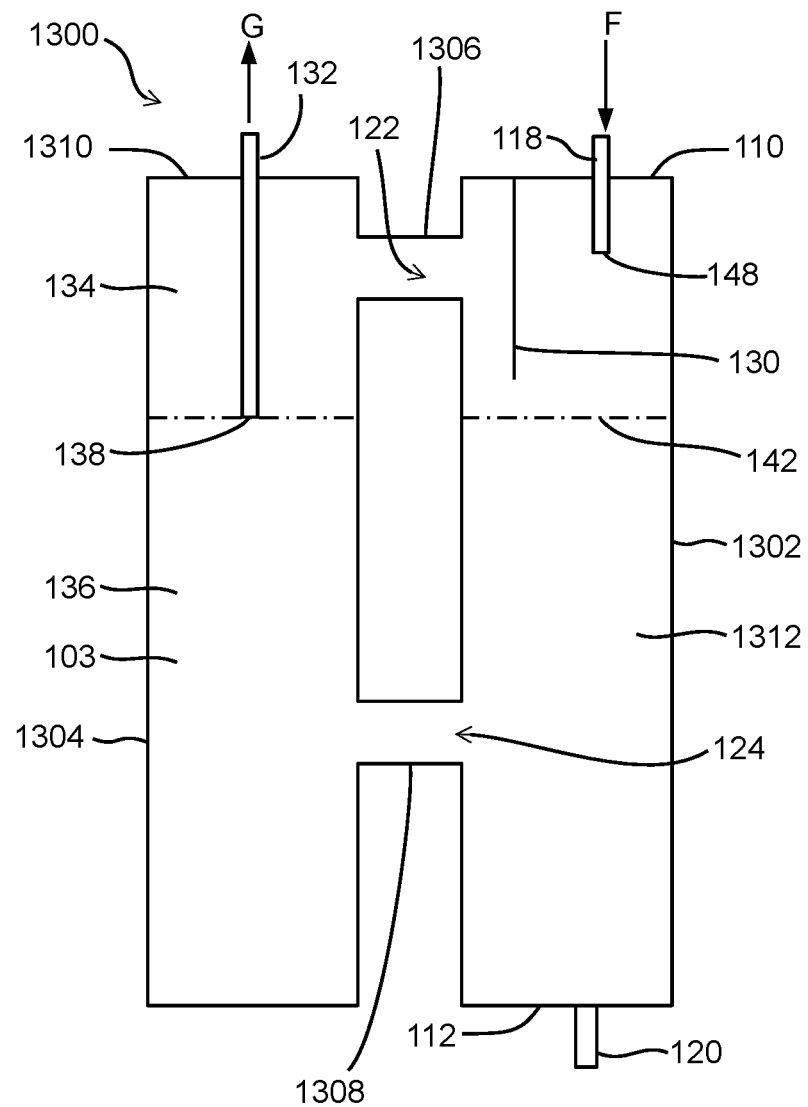
FIG. 25 is a cross-sectional view of a desanding device according to an alternative embodiment, the desanding device comprising a vertically oriented treatment vessel having a fluid inlet and a vertically oriented recovery tank having a fluid outlet, the treatment vessel being in fluid communication with the recovery tank via a gas conduit and a liquid conduit.

FIG. 25 shows a desanding device 1300 according to an alternative embodiment. As shown, the desanding device 1300 comprises a vertically oriented treatment vessel 1302 receiving a fluid inlet 118 extending downwardly from the top wall 110 of the vessel 1302. The desanding device 1300 also comprises a vertically oriented recovery tank 1304 receiving a fluid outlet 132 extending downwardly from the top wall 1310 of the tank 1304. The vessel 1302 and the tank 1304 are in fluid communication via an upper conduit 1306 and a lower conduit 1308, which forms the gas port 122 and liquid port 124, respectively. The intake port 138 of the fluid outlet 132 is at an elevation intermediate the gas port 122 and the liquid port 124. The discharge end 148 of the fluid inlet 118 is at an elevation intermediate the gas port 122 and the intake port 138.

The entire vessel 1302 forms a treatment chamber 1312. The intake port 138 of the fluid outlet 132 divides the tank 1304 into an upper, gas channel 134, which is the annulus between the tank 1304 and the fluid outlet 132 from the gas port 122 to the intake port 138 of the fluid outlet 132, and a lower, liquid channel 136 from the liquid port 124 to the intake port 138 of the fluid outlet 132. Both channels 134 and 136 are in fluid communication with the treatment chamber 1312 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding devices described above.

In above embodiments, the discharge end 148 of the fluid inlet 118 is above the freeboard interface 142 defined by the intake port 138 of the fluid outlet 132. In an alternative embodiment, the discharge end 148 of the fluid inlet 118 is below the freeboard interface 142. The disadvantage of the desanding device in this embodiment is that, the liquid level may grow above the discharge end 148 of the fluid inlet 118, and when it occurs, the fluid stream is injected into the treatment chamber under the liquid surface, and may cause greater turbulence than injecting the fluid stream above the liquid surface.

Those skilled in the art appreciate that the particulate collection structure 104 may alternatively comprise different components. For example, in an alternative embodiment, the particulate collection structure 104 may be a sand sump having a normally-closed valve, a blind, or quick access port or the like, coupled to the particulate drain 120, which is closed when the desanding device is in operation, and is open for cleaning out particulates accumulated in the accumulator portion 146.

In an alternative embodiment, the fluid inlet comprises a nozzle, such as a replaceable nozzle as set forth in Applicant's Canadian Patent Number 2,535,215 issued May 8, 2008, the content of which is incorporated herein by reference in its entirety.

In another embodiment, the fluid inlet 118 comprises a nozzle having a horizontally oriented injection end for connecting to a wellhead, and an inclined discharge end 148 oriented in a direction generally along the inclined axis X-X, such as a nozzle as set forth in FIG. 5.

In some other embodiments, an inlet nozzle having a diverting wall at the discharge end 148 may be used. The detail of such inlet nozzle is disclosed in Applicant's Canadian Patent Application Number 2,836,437, filed in Dec. 16, 2013, the content of which is incorporated herein by reference in its entirety.

The desanding devices described in this disclosure generally exploit the effect of gravity to separate particulates from the multiphase fluid stream injected into a vessel having a limited size, which provide significant advantage for use in oil and gas sites that offer limited operational space.

In above embodiments, the multiple-phase fluid stream comprises liquid L. In some alternative embodiments, the multiple-phase fluid stream does not comprise liquid L. In these embodiment, both the gas channel 134 and the liquid channel 136 are used for directing gas G from the vessel to the fluid outlet 132.

In above embodiments, the gas and liquid channels are physically separated from the treatment chamber by one or more walls. In some embodiments described above, the gas and liquid channels are external to the vessel while in other embodiments described above, the gas and liquid channels are received in the vessel. In embodiments that the gas and liquid channels 134 and 136 are within the vessel, e.g., in embodiments of FIGS. 12-14, 15, and 17-24, it is preferable to design the desanding device in such a way that the treatment chamber has a cross-sectional area much larger than the cross-sectional areas of the gas and liquid channels, respectively. The advantage of such a design is that, for a vessel with a limited cross-sectional area, smaller cross-sectional areas of the gas and liquid channels result in a larger cross-sectional area of the treatment chamber, which means that the fluid stream injected into the treatment chamber experiences greater velocity slow-down, giving rise to better desanding result. Moreover, with smaller cross-sectional areas of the gas and liquid channels, more interior space of the vessel is used as the treatment chamber, improving the desanding capacity.

Those skilled in the art appreciate that, in some alternative embodiments, one of the gas and liquid channels may be outside the vessel and the other of the gas and liquid channels may be received in the vessel.

Those skilled in the art appreciate that, the desanding device may be made of suitable material, such as steel or the like, with specifications satisfying relevant safety code requirement. Also, in embodiments that the desanding device is used for removing particulates from high-pressure fluid streams, the shape of the vessel may also be modified to meet relevant safety requirements. For example, the upper and lower ends of the vessel may be of a semi-spherical shape to provide higher pressure resistance.

In above embodiments, the vessel 102 comprises a vertically oriented particulate drain 120. In some alternative embodiments, the particulate drain 120 may be oriented in other directions.

Figure 26:
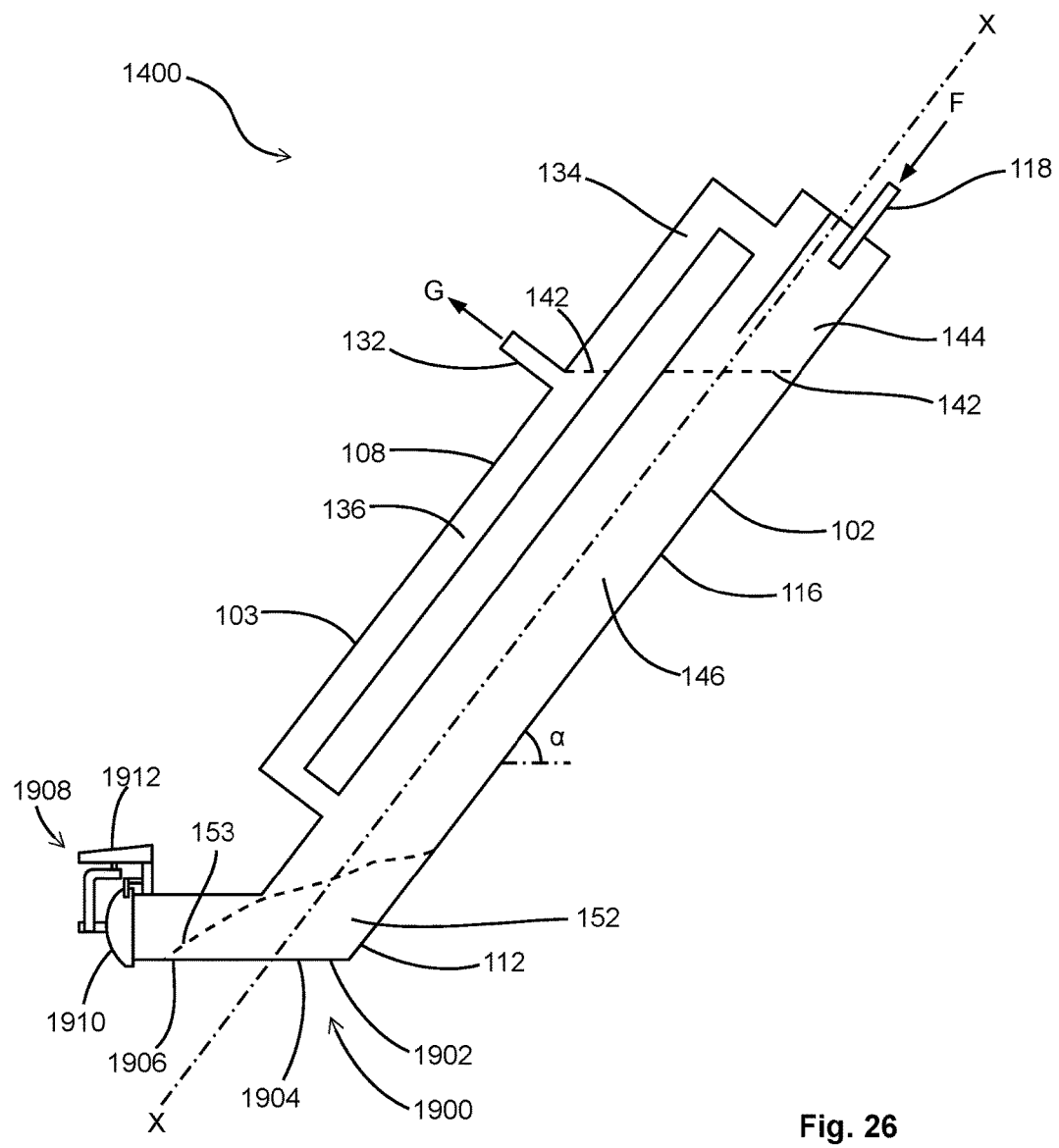
FIG. 26 is a cross-sectional view of a desanding device according to an alternative embodiment, the desanding device being similar to that of FIGS. 8 and 9 but comprising a horizontally oriented particulate drain.

For example, FIG. 26 is a cross-sectional view of a desanding device 1400 according to an alternative embodiment. The desanding device 1400 is similar to that of FIGS. 8 and 9 except that the desanding device 100 in this embodiment comprises a horizontally oriented particulate drain 1900 coupled to the vessel 102 in proximity with the lower end 112 thereof. No particulate collection structure is used.

As shown, the vessel 102 comprises a lower end 112 coupled to a proximal end 1902 of a particulate drain 1900 having a horizontally oriented tubular body 1904. The body 1904 is coupled by suitable means such as welding, threaded couplings, flanges, or the like. The body 1904 is an extension of the vessel and can receive fluids and particulates. A quick closure structure 1908 is coupled to a distal end 1906 of the particulate drain 1900. The quick closure structure 1908 comprises a pressure-rated, hemispherical head 1910 pivotable from the particulate drain body 1904. A gantry 1912 supports the head 1910 and assists in manipulation of the head 1910 for access to the interior of the particulate drain body 1904.

The horizontal orientation of the body 1904 of the particulate drain 1900 aids in operation of the head 1910 of the quick closure structure 1908. Further, the body forms a base for accumulating particulates thereon and for forming the wet sand bank 152 of particulates at about an angle of repose in the body and extending up into the vessel 102. The horizontal extent and height of the body can be sized to arrange a toe 153 of the wet sand bank 152 at about the distal end 1906. Accordingly, when the hemispherical head 1910 is opened to access the drain 1900, the bulk of the particulates do not flow uncontrollably from the vessel, the wet sand 152 bank retaining its structure for the most part, subject to some erosion as liquid flows thereby. As the angle of repose is generally known, the sizing of the drain body can be pre-determined; the smaller the diameter of the drain body 1904, the shorter is the horizontal extent thereof.

The operation of the desanding device 1400 of this embodiment is similar to that described above, except that, in this embodiment, particulates P and liquid L accumulate in the accumulator portion 146 and in the particulate drain 1900.

The removal of accumulated particulates can be conducted periodically. To remove particulates, the operation of the desanding device 1400 is first stopped. Then, the vessel 102 is depressurized. After that, the head 1910 of the particulate drain 1900 is pivoted to an open position. An operator then removes particulates from the particulate drain 1900.

Figure 27:
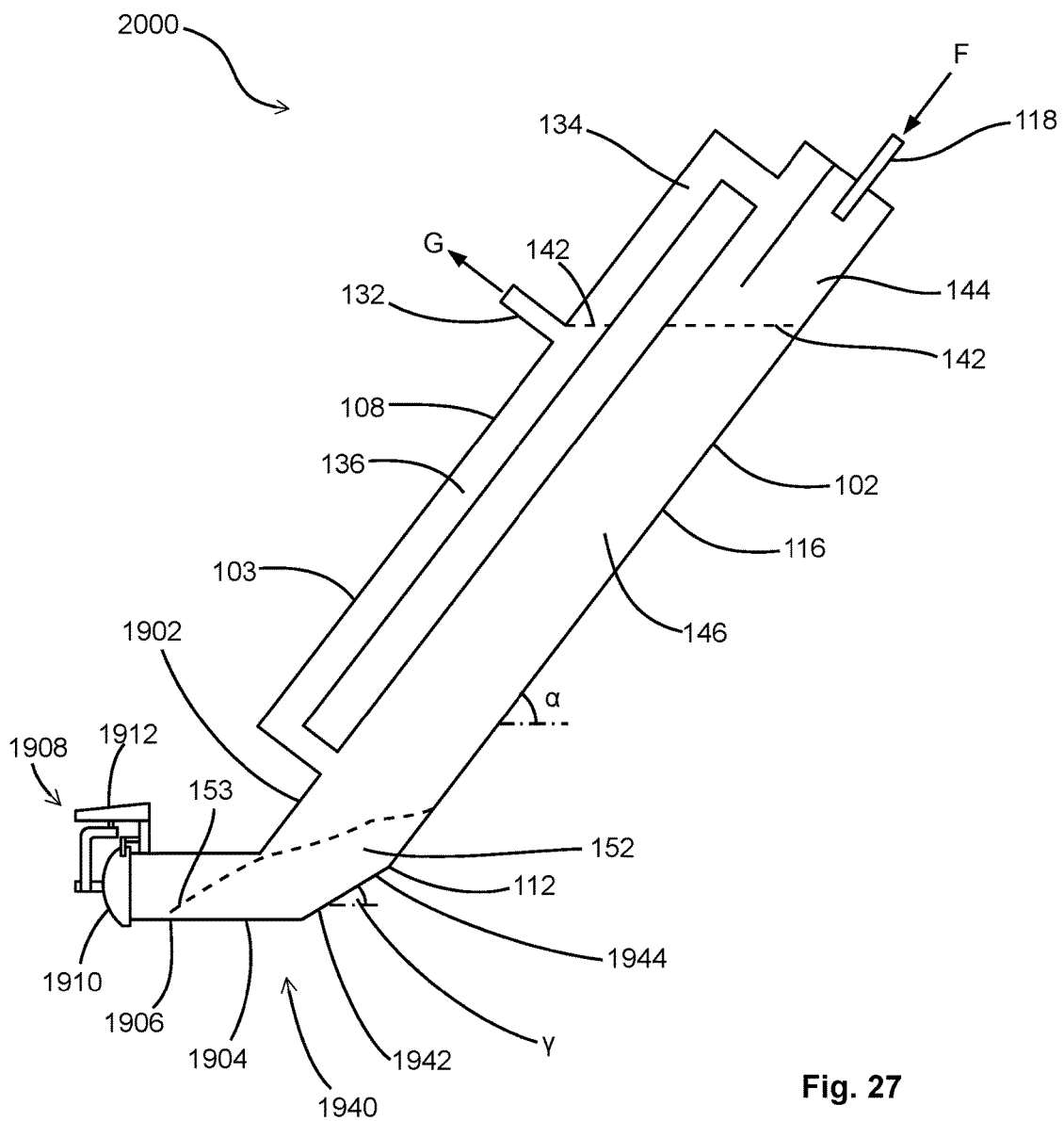
FIG. 27 is a cross-sectional view of a desanding device according to an alternative embodiment, the desanding device being similar to that of FIGS. 8 and 9 but comprising a horizontally oriented particulate drain, the particulate drain comprising a transition section at a proximal end thereof for coupling to the desanding vessel.

FIG. 27 shows a desanding device 2000 having a horizontally oriented particulate drain 1940, according to an alternative embodiment. As shown, the horizontally oriented particulate drain 1940 comprises a transition section 1942 at its proximal end 1902, coupling to the desanding vessel 102. The bottom wall 1944 of the transition section 1942 has an inclination angle γ greater than zero (0) but smaller the inclination angle α of the bottom wall 116 of the vessel 102.

Figure 28:
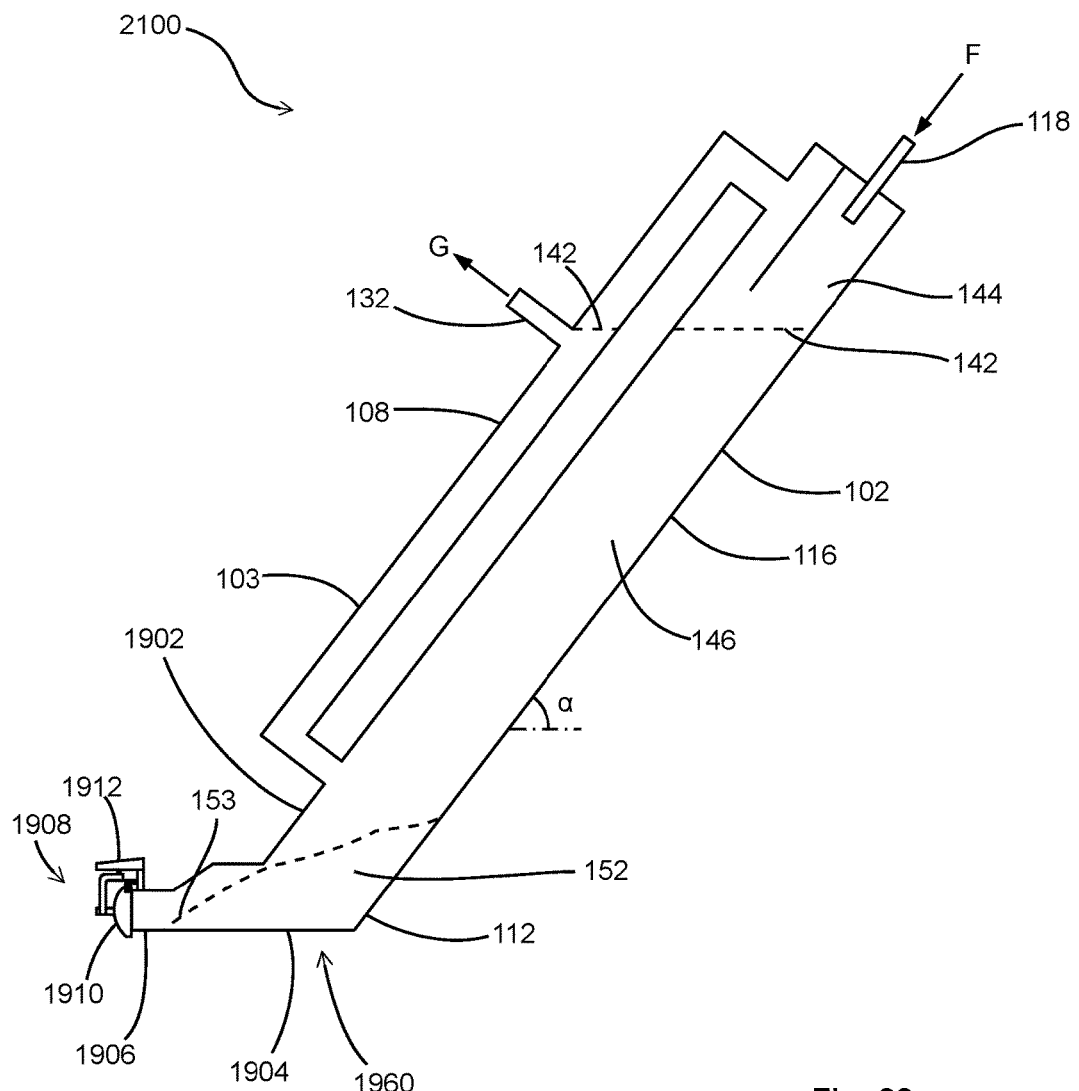
FIG. 28 is a cross-sectional view of a desanding device having a horizontally oriented particulate drain, according to an alternative embodiment, the body of the particulate drain comprising an eccentric distal end to reduce the diameter of the body.

FIG. 28 shows a desanding device 2100 having a horizontally oriented particulate drain 1960, according to an alternative embodiment. In this embodiment, the particulate drain body 1904 comprises an eccentric distal end 1906 to reduce the diameter of the body 1904.

Figure 29:
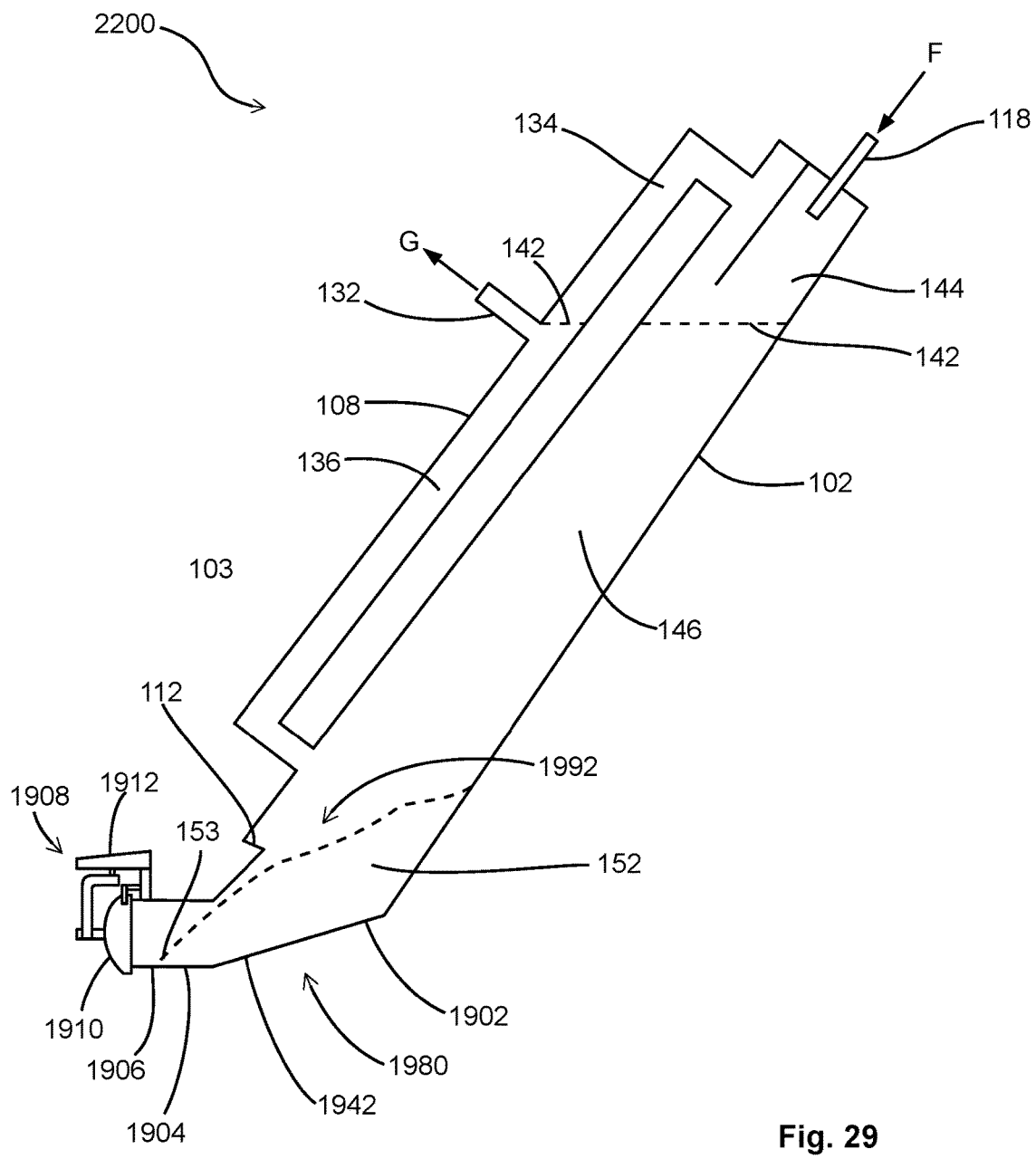
FIG. 29 is a cross-sectional view of a desanding device according to an alternative embodiment, the desanding device being similar to that of FIG. 16 but comprising a horizontally oriented particulate drain.

FIG. 29 shows a desanding device 2100 having a horizontally oriented particulate drain 1980, according to an alternative embodiment. The desanding device 2100 is similar to the desanding device 500 of FIG. 16. However, in this embodiment, the lower end wall 112 of the conical vessel 102 has an opening 1992. The opening 1992 has a smaller diameter than that of the lower end wall 112, and couples to a particulate drain 1980. In this embodiment, the particulate drain 1980 comprises a transition section 1942.

Figure 30:
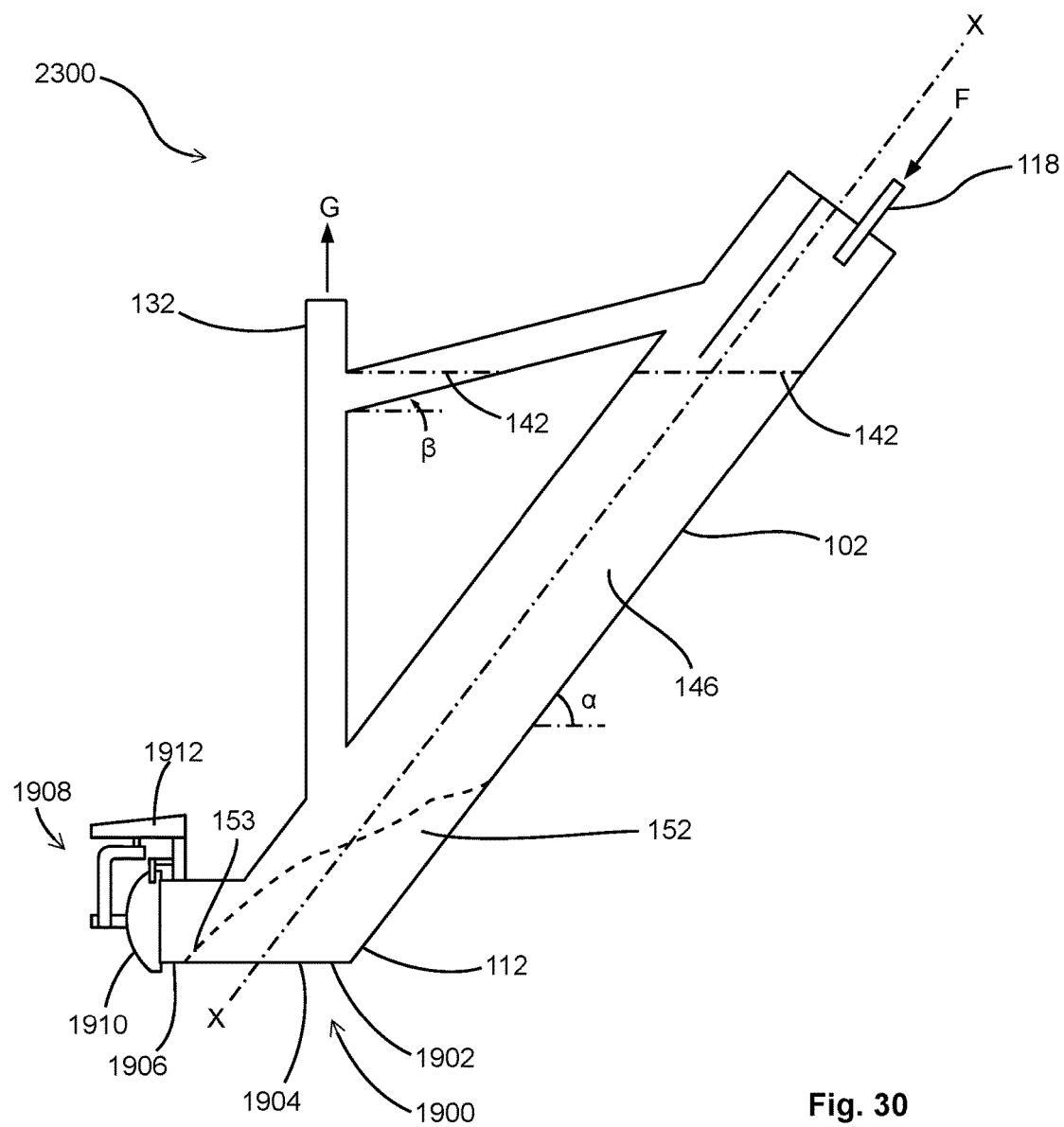
FIG. 30 is a cross-sectional view of a desanding device according to an alternative embodiment, the desanding device being similar to that of FIGS. 10 and 11 but comprising a horizontally oriented particulate drain.
Figure 31:
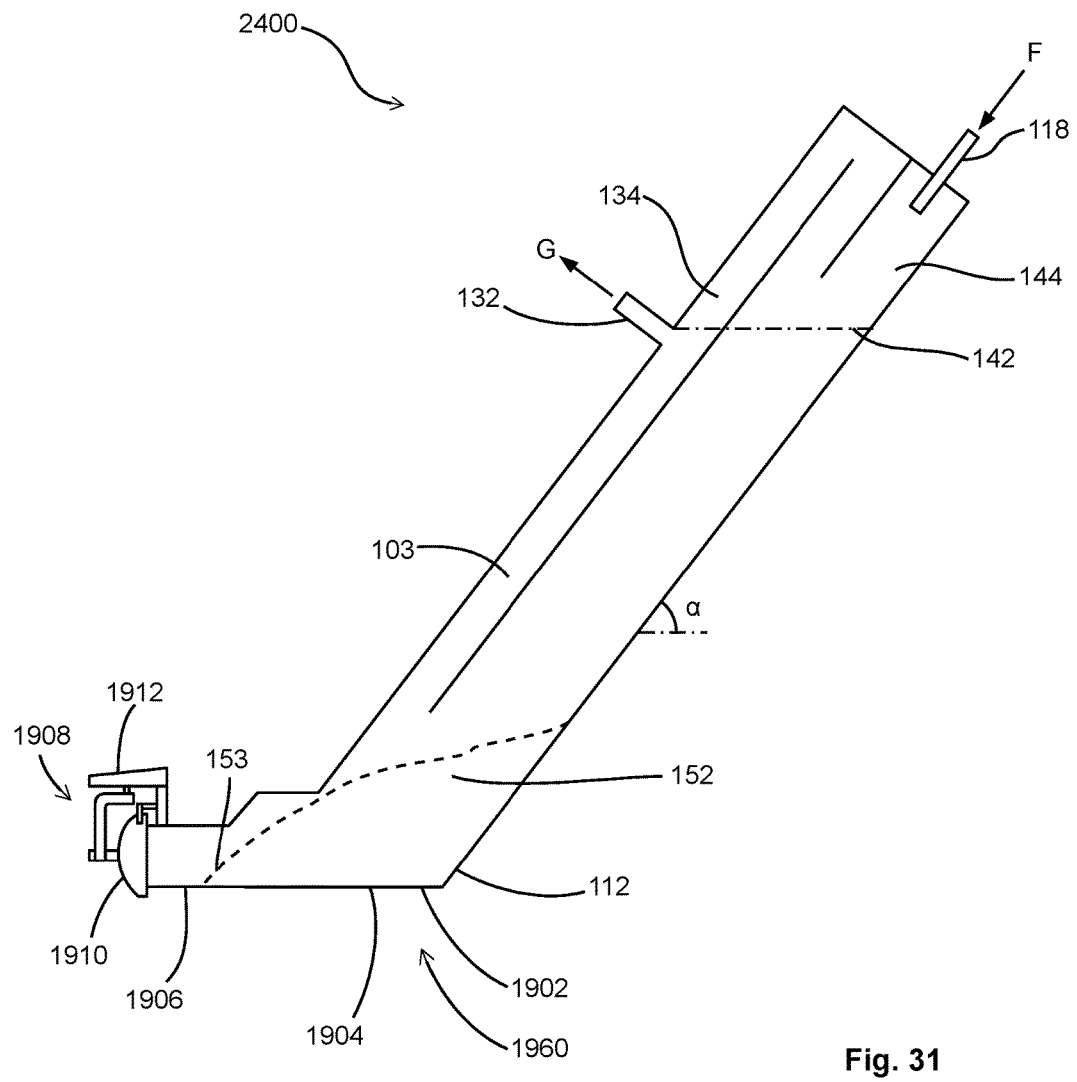
FIG. 31 is a cross-sectional view of a desanding device according to an alternative embodiment, the desanding device being similar to that of FIGS. 12 and 13 but comprising a horizontally oriented particulate drain having an eccentric distal end.
Figure 32:
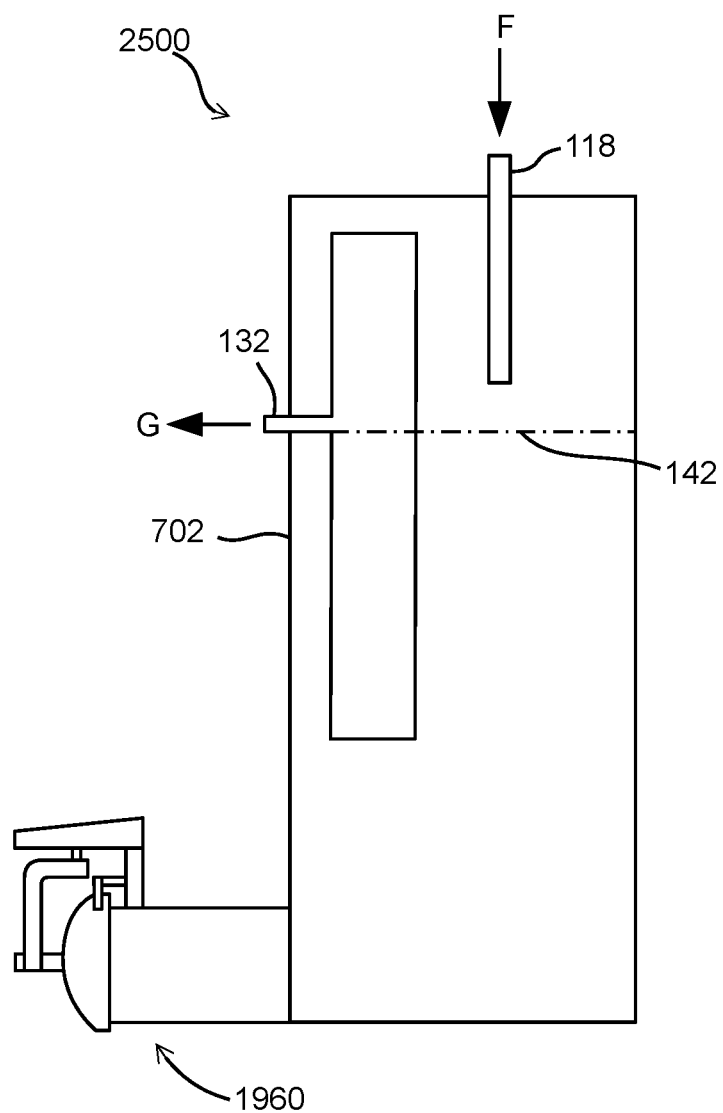
FIGS. 32 and 33, respectively, are cross-sectional views of desanding devices according to alternative embodiments, which are similar to those of FIGS. 18 and 21, respectively, but each comprises a horizontally oriented particulate drain.
Figure 33:
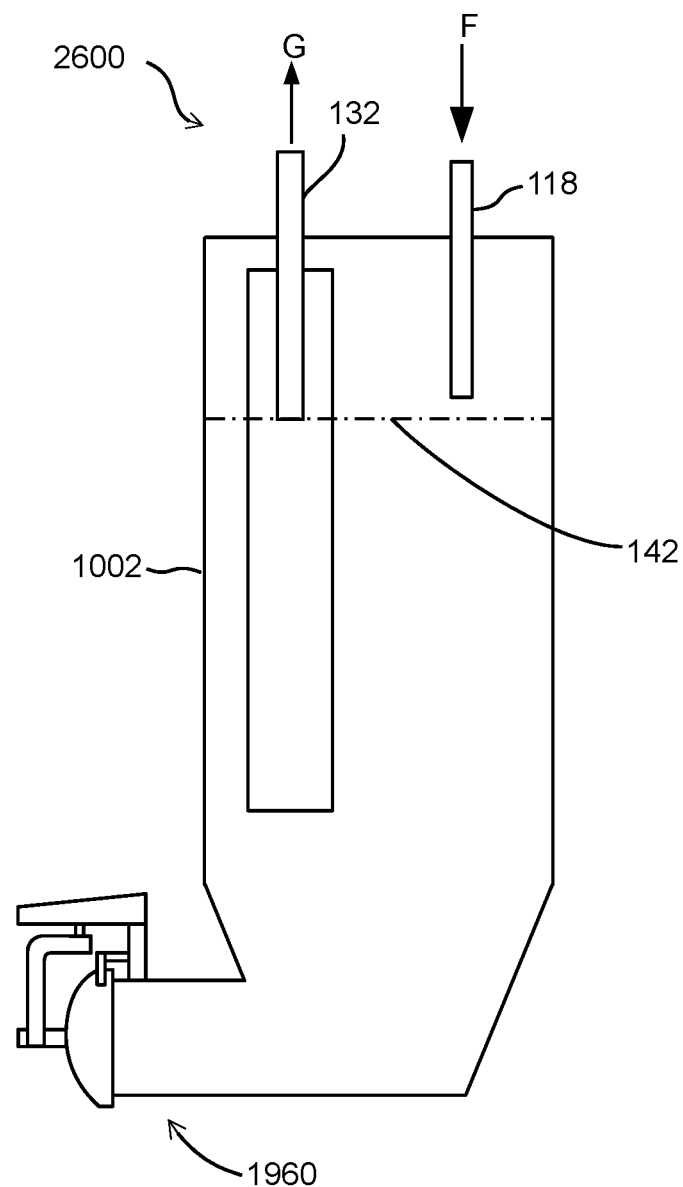

In various embodiments, the horizontally oriented particulate drain 1900, 1940, 1960 or 1980 may be used with other desanding devices described above. For example, FIG. 30 shows a desanding device 2300 similar to the desanding device 200 of FIGS. 10 and 11, but uses a horizontally oriented particulate drain 1900. FIG. 31 shows a desanding device 2400 similar to the desanding device 300 of FIGS. 12 and 13, but uses a horizontally oriented particulate drain 1960 having an eccentric distal end 1906. FIGS. 32 and 33 show desanding devices 2500 and 2600 similar to the desanding device 700 of FIG. 18 and the desanding device 800 of FIG. 21, respectively, but uses a horizontally oriented particulate drain 1900.

Figure 34:
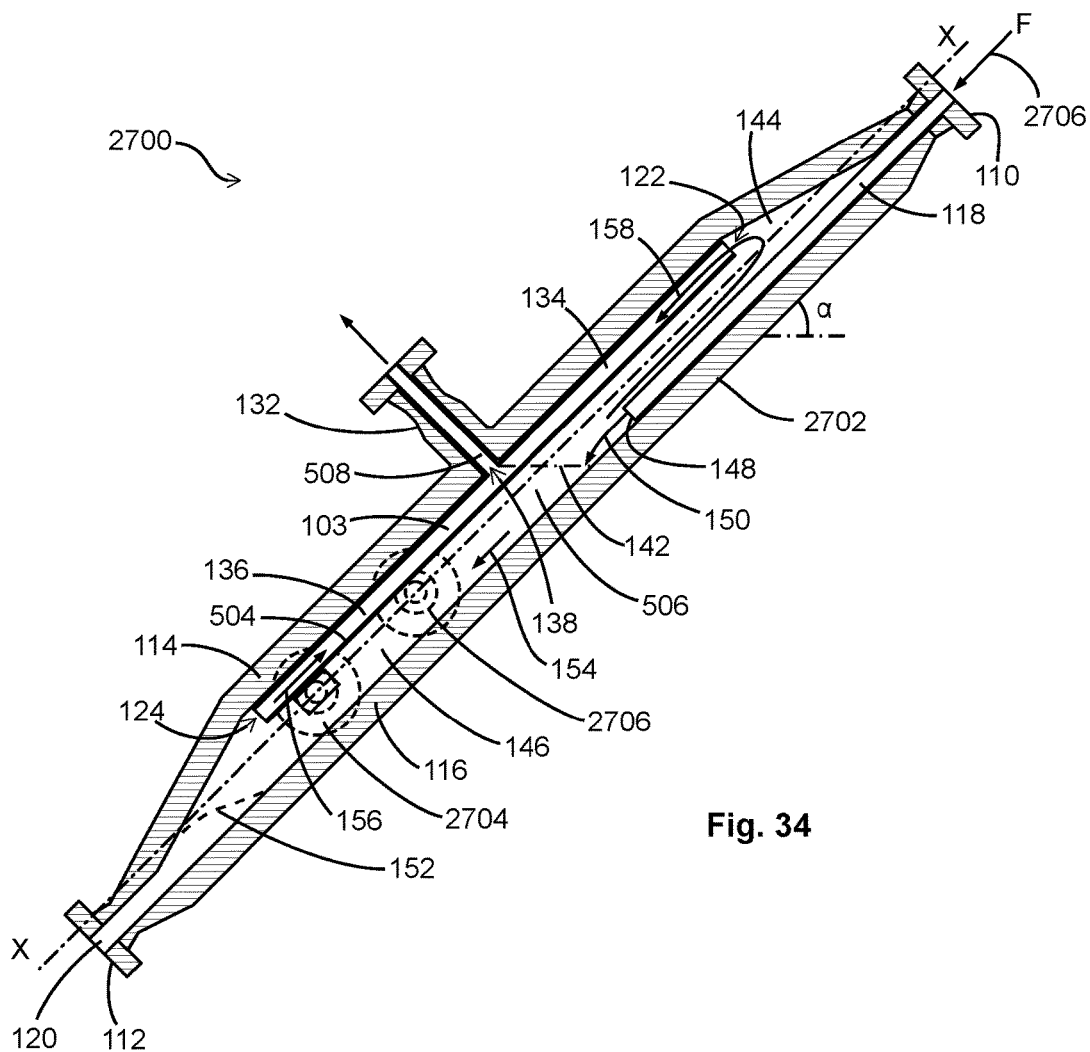
FIG. 34 is a cross-sectional of a desanding device according to an alternative embodiment, the desanding device being similar to that of FIG. 15 and having an extended fluid inlet.
Figure 35:
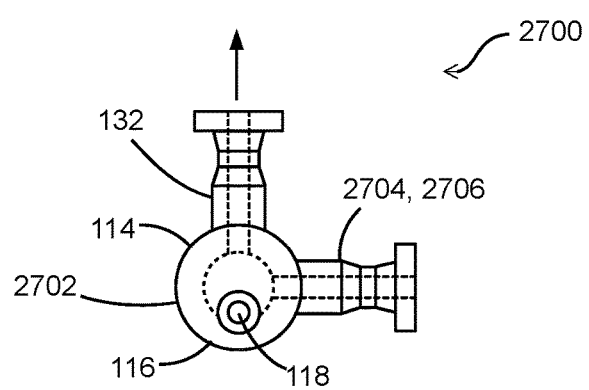
FIG. 35 is an end view of the desanding device of FIG. 34, viewed from the upper end wall thereof along the axis X-X.

FIG. 34 is a cross-sectional view of a desanding device 2700, according to an alternative embodiment. FIG. 35 is an end view of the desanding device 2700 viewed from the upper end wall 110 along the axis X-X, as indicated by the arrow 2706 (which also indicates the direction of the multi-phase fluid stream F).

The desanding device 2700 is similar to that of FIG. 15, and thus the following description focuses on the differences therebetween.

As shown, the vessel 2702 of the desanding device 2700 has a tapered upper and lower ends 110 and 112 for implementation considerations. Of course, those skilled in the art appreciate that, the upper and lower ends 110 and 112 can be any other suitable shapes in alternative embodiments.

In the embodiment of FIGS. 34 and 35, the desanding device 2700 further controls discharge of the fluid stream F at or about the freeboard interface 142. Applicant has determined that, in the typical multi-phase flow containing liquid, particulates tend to pre-separate somewhat to the bottom of the transport lines prior to discharge from the fluid inlet 118 and readily enter the accumulator portion 146 for capture. However, when the fluid stream F is "dry", having less liquid, the efficiency of particulates separation and capture at the accumulator portion 146 is less efficient. For maintaining efficiency of particulate removal, when the fluid stream is dry, the mass rate of flow of the fluid stream F can be manipulated, typically reduced, to maintain a liquid level forming the freeboard interface 142.

The device 2700 comprises a fluid inlet 118 extending into the vessel 2702 from the upper end 110 and parallel to the vessel axis X-X to an elevation such that its discharge end 148 is at about or in proximity with the freeboard interface 142. The elevation of the freeboard interface 142 is again determined by the intake port 138 of the fluid outlet 132, and is spaced from the first, upper opening 122 of the elongated conduit 504. The fluid inlet 118 delivers the fluid stream, even chaotic or turbulent flow of dry gas and particulates more positively to the liquid at the freeboard interface 142, reducing the opportunity for transport of fine particulates to avoid the freeboard interface and flow directly to the upper opening 122.

The short or zero gap between the discharge end 148 of the fluid inlet 118 and the freeboard interface 142 is advantageous. As described before, in a steady, the liquid level or liquid surface of the liquid accumulated in the accumulator portion 146 is at about the freeboard interface 142. As the discharge end 148 of the fluid inlet 132 is in proximity with the liquid surface, particulates discharged from the fluid inlet 132 more directly or immediately impinge liquid accumulated in the accumulator portion 146 and become wet, more effectively trapping particulates in the accumulator portion 146.

Those skilled in the art appreciate that, in an alternative embodiment, the discharge end 148 may be extended into the liquid. However, the operation efficiency may be reduced.

To further improve the trapping of particulates into the accumulator portion 146, in this embodiment, the fluid inlet 118 is extended from the upper end 110 of the vessel 2702 adjacent to or along the bottom wall 116 of the vessel 2702, reducing the distance that wet particulates have to travel before reaching the bottom wall 116. Those skilled in the art appreciate that, in some alternative embodiments, the fluid inlet 118 may be spaced from the bottom wall 166 or not extend parallel thereto. For example, the fluid inlet 118 may extend from the upper end 110 of the vessel 2702 at an angle to the bottom wall 116 to a location such that its discharge end 148 converges with the bottom wall at or about the freeboard interface 142. However, the bottom wall 116 above the freeboard interface 142 is exposed to particulates impingement.

In the embodiment of FIGS. 34 and 35, a particulate drain 120 is located is at the lower end 112 of the vessel 2702. Although not shown, the particulate drain 120 may be coupled to a particulate collection structure similar to the previously described particulate collection structure 104 or any suitable closure.

In this embodiment, the desanding device 2700 also comprises a normally-closed wash bar/sand probe port 2704 for maintenance access purposes or for receiving a sand probe. The desanding device 2700 can further comprise a water injection port 2706 for maintenance purposes.

As introduced above, in many well sites, a first gas and liquid separator vessel is protected from particulate damage with an added, second desanding vessel as described in embodiments above. This added desanding vessel is often temporary and removed once sand production has diminished to acceptable rates. Other sites, due to sand production characteristics or other operational reasons, prefer to place a desander in continuous use. Two pressure-rated vessels are expensive and require additional inspection and maintenance. Accordingly, in another embodiment, the desander can be adapted to also function as a separator, eliminating the first gas and liquid separator vessel.

Figure 36:
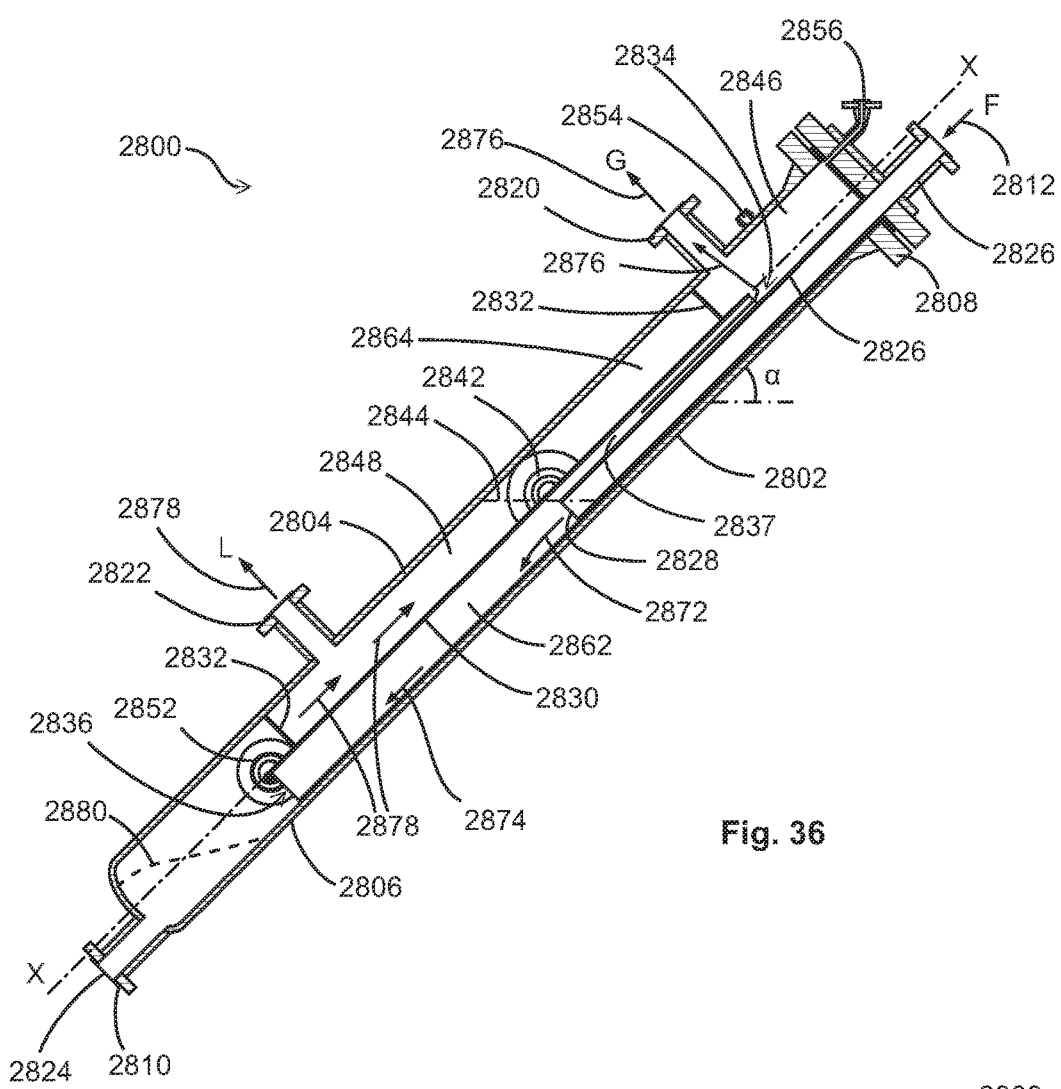
FIG. 36 is a cross-sectional of a desanding device according to an alternative embodiment, the desanding device including a gas liquid separator portion for liquid removal separate from the gas.
Figure 37:
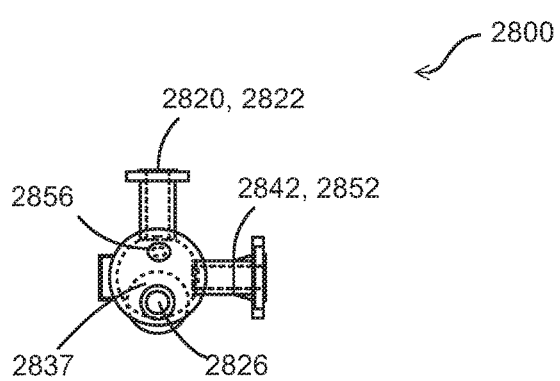
FIG. 37 is an end view of the desanding device of FIG. 36, viewed from the upper end wall thereof along the axis X-X.

FIG. 36 is a cross-sectional view of a device 2800 for removing particulates from a multi-phase fluid stream, and further for separating liquid and gas, according to yet another embodiment. FIG. 37 is an end view of the device 2800 of FIG. 36, viewed from the upper end wall 2808 along the axis X-X, as indicated by the arrow 2812 (which also indicates the direction of the multi-phase fluid stream F).

As shown, the device 2800 comprises an elongated vessel 2802 tilted at an angle α, e.g., 45°. Similar to the vessels described above, the vessel 2802 comprises a top wall 2804, a bottom wall 2806, an upper end wall 2808 and a lower end wall 2810. The vessel 2802 also comprises, on its top wall 2804, a gas outlet 2820 on an upper portion of the vessel 2802, a liquid outlet 2822 spaced from the lower end wall 2810 and below the gas outlet 2820, and a particulate drain 2824 at the lower end wall 2810.

A fluid inlet 2826 extends from the upper end wall 2808 into the vessel 2802 parallel to the axis X-X thereof. The vessel 2802 comprises a shroud 2830 receiving, along a bottom wall thereof, the fluid inlet 2826. The shroud 2830 in this embodiment is an elongated conduit positioned along the bottom wall 2806 of the vessel 2802 and is mounted to the top wall 2804 by a pair of supports 2832. The shroud 2830 has an upper opening 2834 in fluid communication with an upper portion of the vessel 2802 and at an elevation about the gas outlet 2820, and a lower opening 2836 at an elevation below the liquid outlet 2822. As shown in FIG. 36, the fluid inlet 2826 has a discharge end 2828 that is located within the shroud 2830 intermediate the upper opening 2834 and the lower opening 2836. The shroud 2830 has a diameter larger than that of the fluid inlet 2826 for receiving, at its upper opening 2834, the fluid inlet 2826 while allowing gas to flow out from a shroud annulus 2837 formed between the fluid inlet 2826 and the shroud 2830.

In an alternative embodiment, the upper opening 2834 does not need to be at an elevation about the gas outlet 2820.

The vessel 2802 also comprises a liquid level controller 2842 active to maintain liquid in the vessel 2802 and automatically remove steady state accumulations of liquid from the liquid outlet 2822. The liquid level controller 2842 determines a freeboard interface 2844, which is the liquid level at a steady state of operation, such that the discharge end 2828 of the fluid inlet 2826, within the shroud 2830, is at or in proximity with the liquid level at steady state which is, for particulate capture purposes, a design similar to that of FIGS. 34 and 35. Similarly, the freeboard interface 2844 separates a freeboard portion 2846 at an upper portion of the vessel 2902 and an accumulator portion 2848 at a lower portion thereof.

The vessel 2802 may further comprise other components such as a wash bar 2852, a depressurization valve 2854 and a pressure safety valve (PSV) 2856. Although not shown in the figures, the vessel 2802 is supported by suitable supporting structure to maintain the vessel 2802 in its tilted orientation.

In operation, a multi-phase fluid stream F is injected into the vessel 2802 through the fluid inlet 2826 (as indicated by the arrow 2812), and is discharged from the discharge end 2828 of the fluid inlet 2826 into the shroud 2830. The shroud 2830 divides the vessel 2802 into a treatment chamber 2862 within the shroud 2830, and a recovery chamber 2864 between the shroud 2830 and the vessel 2802.

A gas portion G of the multi-phase fluid stream F flows upwardly through the shroud annulus 2837 between the fluid inlet 2826 and the shroud 2830, enters the freeboard portion 2846 via the upper opening 2834 of the shroud 2830, and is discharged out of the vessel 2802 via the gas outlet 2820 (indicated by the arrow 2876).

On the other hand, liquid L and particulates fall out of the stream (indicated by the arrow 2872) onto the bottom wall of the shroud 2830, and settle through the treatment chamber 2862 towards the bottom of the vessel 2802 (indicated by the arrow 2874). Consequently, particulates fall out of and liquid flows from the lower opening 2836 of the shroud 2830, and accumulate in the accumulator portion 2848.

When the multi-phase fluid stream F comprises much more liquid than particulates, the level of liquid grows (indicated by the arrows 2878) much faster than that of particulates. When reaching the liquid outlet 2822, the liquid level controller 2842 discharges liquid L out of the vessel 2802 via the liquid outlet 2822. The liquid discharge rate may be controlled to be smaller than the rate that liquid enters the vessel 2802 from the fluid inlet 2826, such that the liquid level continues to grow in both the treatment chamber 2862 and the recovery chamber 2864 while liquid being discharged through the liquid outlet 2822, until the liquid level reaches the freeboard interface 2842.

The liquid controller 2842 controls the liquid level in the vessel 2802 to be about the freeboard interface at the steady state of operation. Many suitable means may be used for controlling the liquid level. For example, the liquid outlet 2822 may comprise a valve, and the liquid controller 2842 controls the open and close of the valve of the liquid outlet 2822 to maintain the liquid level at about the freeboard interface 2844. Alternatively, the liquid controller 2842 may itself be a liquid outlet having a valve on the vessel at about the freeboard interface 2844 for discharging excess liquid from the vessel 2802 to maintain the liquid level at about the freeboard interface 2844.

At the steady state, the particulates discharged from the discharge end 2828 of the fluid inlet 2826 quickly become wet and fall onto the bottom wall of the shroud 2830 due to the short distance between the discharge end 2828 of the fluid inlet 2826 and the liquid level, and due to the short distance between the discharge end 2828 of the fluid inlet 2826 and the bottom wall of the shroud 2830. The wet particulates migrate to the bottom of the vessel 2802 (indicated by the arrow 2874), and accumulate in the accumulator portion 2848 (indicated by the broken line 2880). The accumulated particulates may be removed from the particulate drain 2824 in a manner similar to what is described above.

Figure 38:
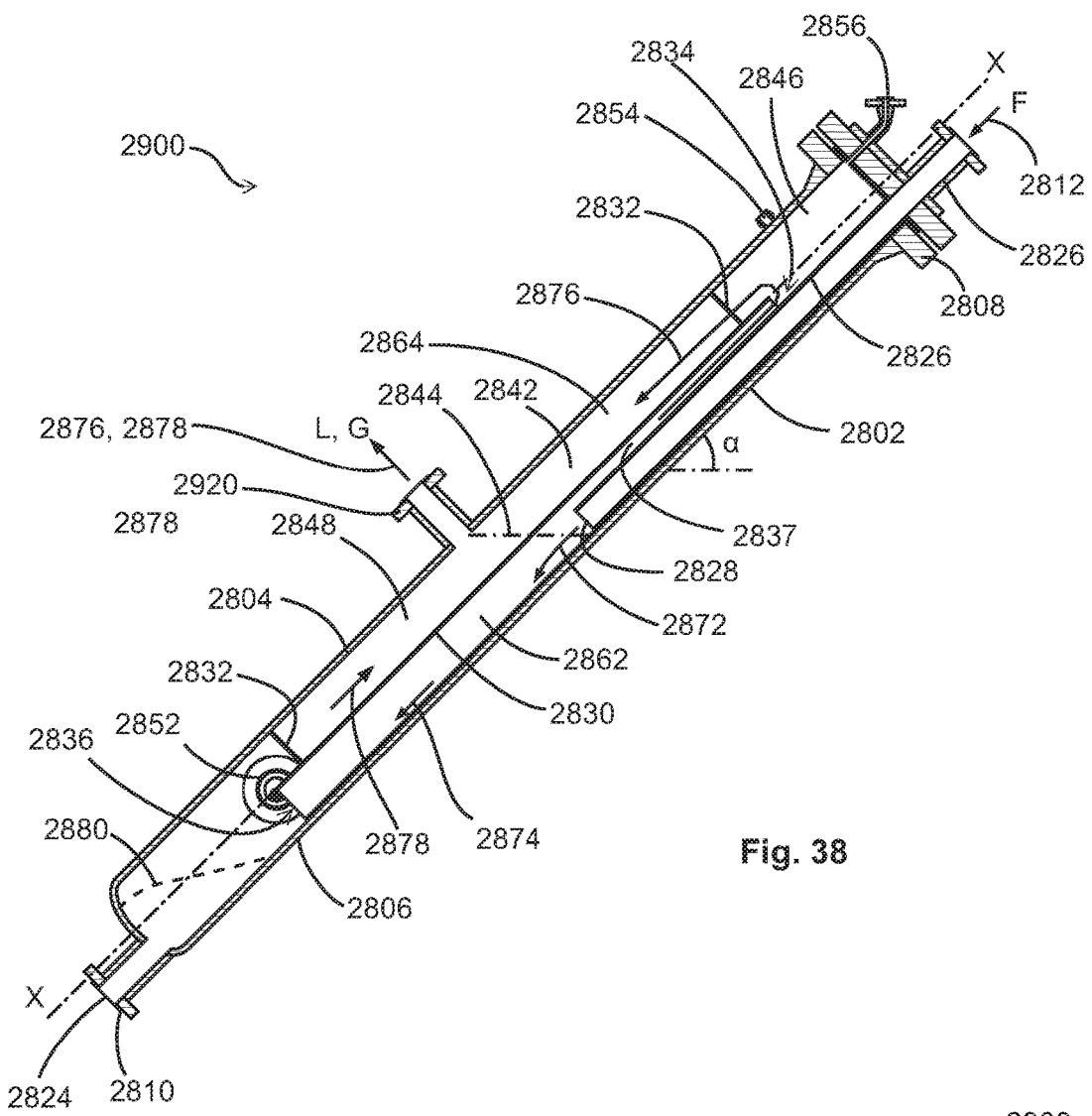
FIG. 38 is a cross-sectional of a desanding device according to an alternative embodiment, the desanding device being similar to that of FIG. 15 and having an extended fluid inlet.
Figure 39:
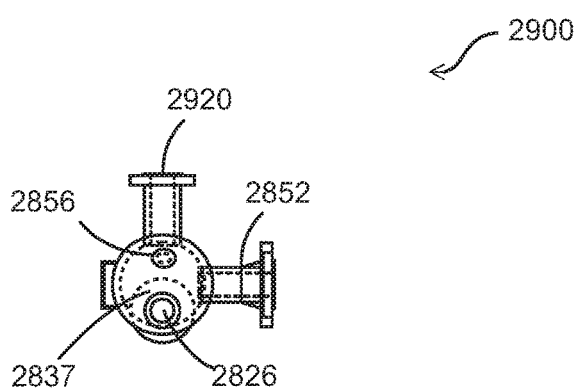
FIG. 39 is an end view of the desanding device of FIG. 38, viewed from the upper end wall thereof along the axis X-X.

In another embodiment of a desander, not providing liquid and gas separation, FIG. 38 is a cross-sectional view of a desanding device 2900 implementing the shroud or extended fluid inlet or both. FIG. 39 is an end view of the desanding device 2900 viewed from the upper end wall 2808 along the axis X-X, as indicated by the arrow 2812 (which also indicates the direction of the multi-phase fluid stream F).

The desanding device 2900 is similar to the device 2800 of FIGS. 36 and 37 with the following differences. First, the desanding device 2900 only comprises a liquid/gas outlet 2920 rather than separate liquid and gas outlets. The liquid/gas outlet 2920 is located at an elevation about that of the discharge end 2828 of the fluid inlet 2826 such that the freeboard interface 2844, and thus the liquid level at a stead state, are determined by the liquid/gas outlet 2920 at an elevation about that of the discharge end 2828 of the fluid inlet 2826. Moreover, as in the desanding device of FIG. 34, the desanding device 2900 does not comprise any liquid level controller.

In this embodiment, the upper opening 2834 of the shroud 2830 is at an elevation above the liquid/gas outlet 2920, and the lower opening 2836 of the shroud 2830 is at an elevation below the liquid/gas outlet 2920. The treatment chamber 2862 is defined by the shroud 2830, and the recovery chamber 2864 is the vessel 2802 excluding the space occupied by the shroud 2830.

In an alternative embodiment, the desanding device is similar to that of FIGS. 38 and 39, but further comprises an elongated conduit similar to the elongated conduit 504 of FIG. 15 or FIG. 34 for connecting to the fluid outlet 2920.

In above embodiments, the fluid outlet 132, the gas outlet and the liquid outlet are conveniently located on the top wall of the vessel. However, in some alternative embodiments, any or all of these outlets may be located more generally on an upper portion of the vessels, including on a sidewall of the vessel.

In an alternative embodiment for desanding a multiple-phase, "dry" fluid stream F comprising gas and particulates, a desanding device similar to any one of the above described desanding devices may comprise a liquid makeup inlet having a liquid makeup valve for injecting suitable liquid, such as water or oil, into the vessel. Prior to or during the desanding operation, an operator may operate the liquid makeup valve to inject liquid into the vessel for filling the accumulator portion and form a liquid surface at about the freeboard interface.

During operation of desanding the "dry" fluid stream, liquid in the vessel may be gradually depleted, e.g., being carried out by gas from the fluid outlet. Thus, the liquid makeup valve may be operated, periodically or as needed, to refill liquid into the vessel to maintain the liquid surface at about the freeboard interface. The operation of the liquid makeup valve may be manual or automatic. For example, the liquid makeup valve may be manually or automatically turned on and off according to a predefined schedule. As another example, the vessel may comprise a liquid level controller to automatically control the liquid makeup valve on and off to maintain the liquid level in the vessel.

In another embodiment, the liquid makeup valve may be operated to maintain the liquid surface at a level lower than the freeboard interface.

In yet another embodiment, the liquid makeup valve is shut off during operation.

In still another embodiment, the liquid makeup valve may also be used for maintenance purposes during maintenance. For example, the desanding device may be that of FIG. 34, wherein the water injection port 2706 is used as a liquid makeup inlet during operation, and used for cleaning the vessel during maintenance.

Although embodiments have been described above with reference to the accompanying drawings, those of skill in the art will appreciate that variations and modifications may be made without departing from the scope thereof as defined by the appended claims.

The embodiments of the invention for which an exclusive property or privilege is claimed are defined as follows:

1. A device for removing at least particulates from a multiple-phase fluid stream containing gas, liquid and entrained particulates comprising:
   a fluid inlet at an upper portion of a vessel for receiving the fluid stream, the fluid inlet extending into the vessel to a discharge end;
   a gas outlet at the upper portion of the vessel, the gas outlet at an elevation at or above the fluid inlet's discharge end;
   a liquid outlet from the vessel; and
   a shroud within the vessel, the shroud comprising a conduit forming a treatment chamber within, and a recovery chamber between the conduit and the vessel, the treatment chamber having an upper opening in fluid communication with the upper portion of the recovery chamber of the vessel and a lower opening in fluid communication with a lower portion of the recovery chamber at an elevation below the liquid outlet, the upper opening receiving the fluid inlet therein with the fluid inlet's discharge end within the conduit intermediate the upper and lower openings, the fluid inlet forming a shroud annulus at the upper opening between the fluid inlet and the conduit,
   the conduit receiving the fluid stream from the discharge end of the fluid inlet into the treatment chamber and flowing gas out of the treatment chamber through the shroud annulus and into the upper portion of the vessel for discharge through the gas outlet, and flowing liquid and particulates out of the treatment chamber through the lower opening into the lower portion of the vessel, the liquid flowing to the liquid outlet.

2. The device of claim 1, wherein the fluid outlet is at an elevation lower than the discharge end of the fluid inlet.

3. The device of claim 1, wherein the vessel comprises a bottom wall, and the conduit extends along the bottom wall, said bottom wall having a non-zero inclination angle $\alpha$ with respect to a horizontal plane.

4. The device of claim 1, wherein the liquid outlet is spaced from the gas outlet and at an elevation therebelow, the device further comprising:
   a liquid level controller for controlling a liquid level at about or below a discharge end of the fluid inlet.

5. The device of claim 4, wherein the fluid outlet is at an elevation lower than the discharge end of the fluid inlet.

6. The device of claim 4, wherein the vessel comprises a bottom wall, and the conduit extends along the bottom wall, said bottom wall having a non-zero inclination angle $\alpha$ with respect to a horizontal plane.

7. The device of claim 4, wherein the vessel further comprises a particulate drain for removing particulates from said treatment chamber.

8. The device of claim 4, wherein a freeboard interface is formed in the recovery chamber and in the treatment chamber at the liquid level.

9. The device of claim 8, wherein the fluid inlet extends to an elevation within the vessel such that a discharge end of the fluid inlet is at about the freeboard interface.

10. The device of claim 9, wherein the particulate drain is located at the lower portion of the vessel.

11. The device of claim 1, wherein:
   the recovery chamber has a first, upper port in fluid communication with the conduit's upper opening for receiving gas therefrom, and a second, lower port in fluid communication with the conduit's lower opening, the fluid outlet intermediate the first upper and second lower ports for discharging at least particulate-removed gas.

12. The device of claim 11, wherein the fluid outlet is a liquid/gas outlet for both the liquid outlet and the gas outlet.

13. The device of claim 11, wherein the conduit of the recovery chamber is external to the vessel and in fluid communication with the treatment chamber via the first and second ports.

14. The device of claim 11, wherein a freeboard interface between liquid and gas is formed in the recovery chamber and in the treatment chamber at the elevation of the fluid outlet.

15. The device of claim 14, wherein the fluid inlet extends to an elevation within the vessel such that a discharge end of the fluid inlet is at about the freeboard interface.

16. The device of claim 1, wherein the vessel further comprises a particulate drain for removing particulates from said treatment chamber.

17. The device of claim 16, wherein the particulate drain comprises a horizontally-oriented body.

18. The device of claim 16, wherein the particulate drain is located at the lower portion of the vessel.

* * * * *

UNITED STATES PATENT AND TRADEMARK OFFICE
CERTIFICATE OF CORRECTION

PATENT NO. : 9,909,405 B2  
APPLICATION NO. : 14/958717  
DATED : March 6, 2018  
INVENTOR(S) : Christopher Hemstock Page 1 of 1

It is certified that error appears in the above-identified patent and that said Letters Patent is hereby corrected as shown below:

In the Claims

In Claim 2 at Column 30, Line 24, replace "the fluid outlet" with "the liquid outlet".

In Claim 5 at Column 30, Line 36, replace "the fluid outlet" with "the liquid outlet".

In Claim 11 at Column 30, Line 59, replace "the fluid outlet" with "the liquid outlet".

In Claim 12 at Column 30, Line 62, replace "the fluid outlet" with "the liquid outlet".

In Claim 14 at Column 31, Line 3, replace "the fluid outlet" with "the liquid outlet".

In Claim 16 at Column 31, Line 10, replace "the treatment chamber" with "the recovery chamber".

Signed and Sealed this  
Seventh Day of May, 2019

Andrei Iancu  
*Director of the United States Patent and Trademark Office*